United States Patent
Radu

(10) Patent No.: US 11,120,436 B2
(45) Date of Patent: Sep. 14, 2021

(54) AUTHENTICATION SYSTEM AND METHOD FOR SERVER-BASED PAYMENTS

(71) Applicant: MasterCard International Incorporated, Purchase, NY (US)

(72) Inventor: Cristian Radu, Beauvechain (BE)

(73) Assignee: Mastercard International Incorporated, Purchase, NY (US)

( * ) Notice: Subject to any disclaimer, the term of this patent is extended or adjusted under 35 U.S.C. 154(b) by 1823 days.

(21) Appl. No.: 14/802,210

(22) Filed: Jul. 17, 2015

(65) Prior Publication Data
US 2017/0017957 A1 Jan. 19, 2017

(51) Int. Cl.
*G06Q 20/00* (2012.01)
*G06Q 20/38* (2012.01)
(Continued)

(52) U.S. Cl.
CPC ......... *G06Q 20/3829* (2013.01); *G06Q 20/32* (2013.01); *G06Q 20/36* (2013.01); *G06Q 20/363* (2013.01); *G06Q 20/3674* (2013.01); *G06Q 20/382* (2013.01); *G06Q 20/385* (2013.01); *G06Q 20/388* (2013.01); *G06Q 20/3821* (2013.01); *G06Q 20/3823* (2013.01); *G06Q 20/4012* (2013.01); *G06Q 20/4014* (2013.01); *G06Q 20/40145* (2013.01);
(Continued)

(58) Field of Classification Search
CPC ........... G06Q 20/3829; G06Q 20/4012; G06Q 20/388; G06Q 20/385; G06Q 20/3821; G06Q 20/4014; G06Q 20/3823; G06Q 20/382; G06Q 20/3674; G06Q 20/36; G06Q 20/32; G06Q 20/40145; G06Q 20/363; G06Q 2220/00; H04L 63/0861; H04L 2463/082; H04W 12/06; H04W 12/04
See application file for complete search history.

(56) References Cited

U.S. PATENT DOCUMENTS 6,873,974 B1 3/2005 Schutzer
2007/0255661 A1 11/2007 Yoshida
(Continued)

FOREIGN PATENT DOCUMENTS

JP H11232348 A 8/1999
JP 2004326725 A 11/2004
(Continued)

OTHER PUBLICATIONS

"Extended European Search Report" International Searching Authority, dated Dec. 10, 2018, for European Application No. 16828181, 11 pp.
(Continued)

*Primary Examiner* — John W Hayes
*Assistant Examiner* — Dennis G Keritsis
(74) *Attorney, Agent, or Firm* — Buckley, Maschoff & Talwalkar LLC

(57) ABSTRACT

A method of performing a payment transaction employing a two-factor authentication mechanism. The method includes engaging in cryptographic processing with a cryptographic function having a secret key encoded therein. The cryptographic function is stored in a computing device. The secret key serves as a first authentication factor. The method further includes utilizing a second authentication factor in performing the payment transaction.

9 Claims, 24 Drawing Sheets

(51) Int. Cl.
*G06Q 20/40* (2012.01)
*G06Q 20/36* (2012.01)
*G06Q 20/32* (2012.01)
*H04W 12/30* (2021.01)
*H04W 12/04* (2021.01)
*H04L 29/06* (2006.01)
*H04W 12/06* (2021.01)

(52) U.S. Cl.
CPC ........ *H04W 12/35* (2021.01); *G06Q 2220/00* (2013.01); *H04L 63/0861* (2013.01); *H04L 2463/082* (2013.01); *H04W 12/04* (2013.01); *H04W 12/06* (2013.01)

(56) References Cited

U.S. PATENT DOCUMENTS

| | | | |
|---|---|---|---|
| 2011/0004557 A1 | 1/2011 | Wang | |
| 2011/0314281 A1* | 12/2011 | Fielder | H04L 9/0838 713/168 |
| 2013/0110658 A1* | 5/2013 | Lyman | G06Q 20/20 705/18 |
| 2014/0358796 A1 | 12/2014 | Smets et al. | |
| 2015/0046340 A1 | 2/2015 | Dimmick | |
| 2015/0124963 A1 | 5/2015 | McCusker et al. | |
| 2015/0156176 A1 | 6/2015 | Collinge et al. | |

FOREIGN PATENT DOCUMENTS

| | | |
|---|---|---|
| JP | 2015-095208 A | 5/2015 |
| JP | 2015095208 A | 5/2015 |
| WO | 99/24892 A2 | 5/1999 |
| WO | 2009/051989 A1 | 4/2009 |
| WO | 2009051989 A1 | 4/2009 |
| WO | 2010/146140 A1 | 12/2010 |
| WO | 2013/151797 A1 | 10/2013 |
| WO | 2013151797 A1 | 10/2013 |
| WO | 2015/084755 A | 6/2015 |
| WO | 2015084755 A1 | 6/2015 |

OTHER PUBLICATIONS

Wyseur, Brecht, "White-Box Cryptography: Hiding Keys in Software", Feb. 15, 2012, Retrieved from the Internet: http://whiteboxcrypto.com/files/2012_misc.pdf, 9 pp.

"PCT Notification of Transmittal of the International Search Report and the Written Opinion" International Searching Authority, dated Oct. 11, 2016 (Oct. 11, 2016), for International Application No. PCT/US2016/037159, 9pgs.

Yamauchi, Hiroki et al.: "A Goal-Oriented Approach to Software Obfuscation", International Journal of Computer Science and Network Security, vol. 8, No. 9, Sep. 2008, pp. 59-71.

Ogiso, Toshio et al: "Software Obfuscation on a Theoretical Basis and Its Implementation", IEICE Trans. Fundamentals, vol. E86-A, No. 1, Jan. 2003, pp. 176-186.

"Japanese Office Action", drafting dated Apr. 15, 2019, for Japanese Application No. 2018-502105, 5pp.

"English-language Translation of Japanese Office Action", drafting dated Apr. 15, 2019, for Japanese Application No. 2018-502105, 7pp.

European Search Report and Written Opinion dated Sep. 30, 2019 which was issue in connection with EP 16828181.4 which was filed on Jun. 13, 2016.

Brecht Wyseur: "White-Box Cryptography: Hiding Keys in Software", Feb. 15, 2012, Retrieved from the Internet: URL: http://whieboxcrypto.com/files/2012_misc.pdf [retrieved on Sep. 25, 2013].

"Japanese Office Action", drafting dated Jan. 10, 2020, for Japanese Application No. 2018-502105, 3pp.

"English-language Translation of Japanese Office Action", drafting dated Jan. 10, 2020, for Japanese Application No. 2018-502105, 5pp.

* cited by examiner

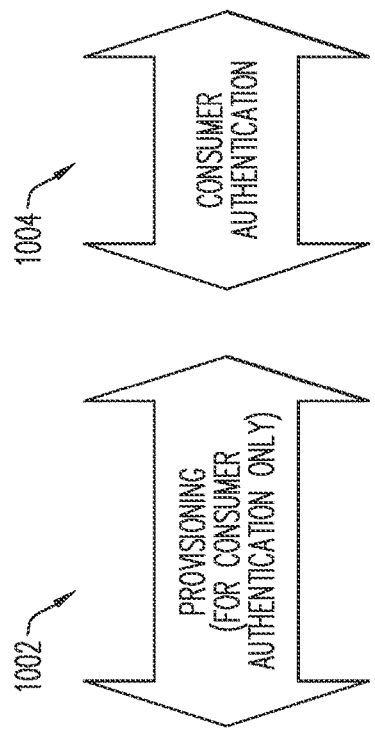
FIG. 10
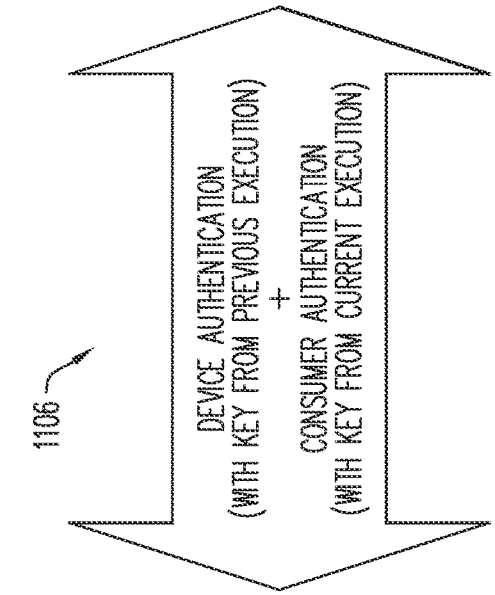
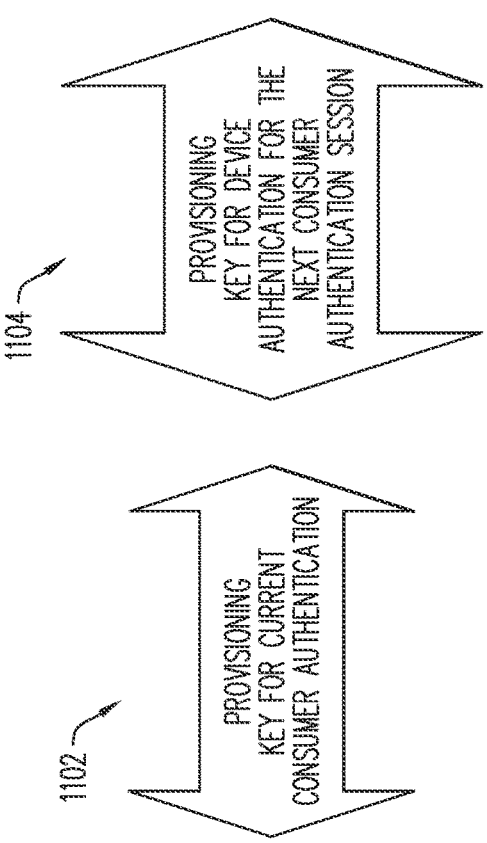
FIG. 11

AUTHENTICATION SYSTEM AND METHOD FOR SERVER-BASED PAYMENTS

BACKGROUND

Payment accounts such as credit card accounts and debit card accounts are in widespread use. In one conventional manner of accessing a payment account, the account holder presents a plastic card at the point of sale in a retail store. The point of sale device reads account information from the card (e.g., via a magnetic stripe or through wireless communication with an integrated circuit in the card, or via electrical contacts on the card) and initiates a payment account transaction using the information read from the card.

Payment accounts are also widely used in e-commerce. For example, an account holder may use a personal computer or a smartphone to access a merchant's online store webpage. After selecting goods for purchase and then opting for "check out", the account holder is prompted to enter his/her payment account information into a data entry screen downloaded to his/her computer (or smartphone). The merchant's e-commerce host computer then initiates a payment account transaction using the information that was entered by the account holder.

Given that many users of payment accounts may have more than one such account, there have been proposals for so-called digital wallets. According to one type of proposed arrangement, a wallet service provider (WSP) maintains digital wallets for a large number of users. Each user causes some or all of his/her payment accounts to be enrolled in his/her digital wallet, and the WSP stores the corresponding information in a data partition that is dedicated to the respective user and thus forms his/her digital wallet. When the user seeks to check out at the conclusion of an e-commerce shopping transaction, the user is given the option to access his/her wallet at the wallet service provider. Via data communication among the user's computer/smartphone, the merchant's e-commerce host computer and the WSP's computer, the user is presented with an option to select one of his/her enrolled payment accounts for use in the current e-commerce transaction. This may require very little effort on the part of the user. Once the user selects the desired payment account from his/her digital wallet, the merchant is enabled to use the corresponding account information to initiate a payment account transaction using the account selected by the user. This type of arrangement may offer great convenience to the user/online shopper, because he/she is freed from entering the payment account information details as part of the e-commerce transaction. At the same time, the user has the option of selecting among various payment accounts, and is not required to entrust his/her payment account information for storage on the merchant's e-commerce computer.

Another type of proposal for a digital wallet is based on payment-enabled smartphones or similar mobile devices. Instead of storing just one set of payment account credentials in a payment-enabled smartphone, the user may be allowed to enter the information for several different payment accounts into the payment-enabled smartphone. The smartphone runs a wallet application, which manages the user's access to the payment card account information stored in the smartphone. The account information corresponding to the wallet function in the smartphone may be stored in a so-called "secure element" (SE) within the smartphone. At the point of sale, the user interacts with the smartphone wallet application via the smartphone user interface to select one of the payment accounts for which information was stored in the smartphone. The smartphone then wirelessly transmits the information for the selected payment account to the point of sale terminal via NFC (Near Field Communication) or other standard communication protocol. For example, the smartphone may run a payment account app (application program) that emulates an IC payment card in its interaction with the point of sale terminal. The point of sale terminal, in turn, initiates a payment card account transaction based on the payment card account information it received from the smartphone.

There have also been proposals to emulate the SE functions of a smartphone remotely, thereby potentially reducing the hardware cost and complexity for a smartphone that provides digital wallet functionality. The SE is under the control of a Mobile Network Operator (MNO) or equipment manufacturer, therefore rendering the WSP hosting the card or the card's issuer dependent on the MNO or equipment manufacturer.

Business considerations, as well as regulatory requirements in some jurisdictions, call for the user's access to his/her digital wallet to be protected from unauthorized use with a high degree of security. At the same time, other business considerations call for security measures to be readily and economically instituted and administered based on currently existing technological platforms and distribution systems, and without placing onerous or expensive requirements on parties such as device manufacturers and mobile network operators (MNOs). Perhaps of paramount importance is the desirability of providing a simple and straightforward user experience in conducting wallet transactions, while still adhering to an appropriate level of security measures.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein:

FIG. 10 is a diagram that illustrates an approach for authentication credential provisioning in accordance with some embodiments.

FIG. 11 is a diagram that illustrates an approach for authentication credential provisioning according to other embodiments.

DETAILED DESCRIPTION

Figure 1:
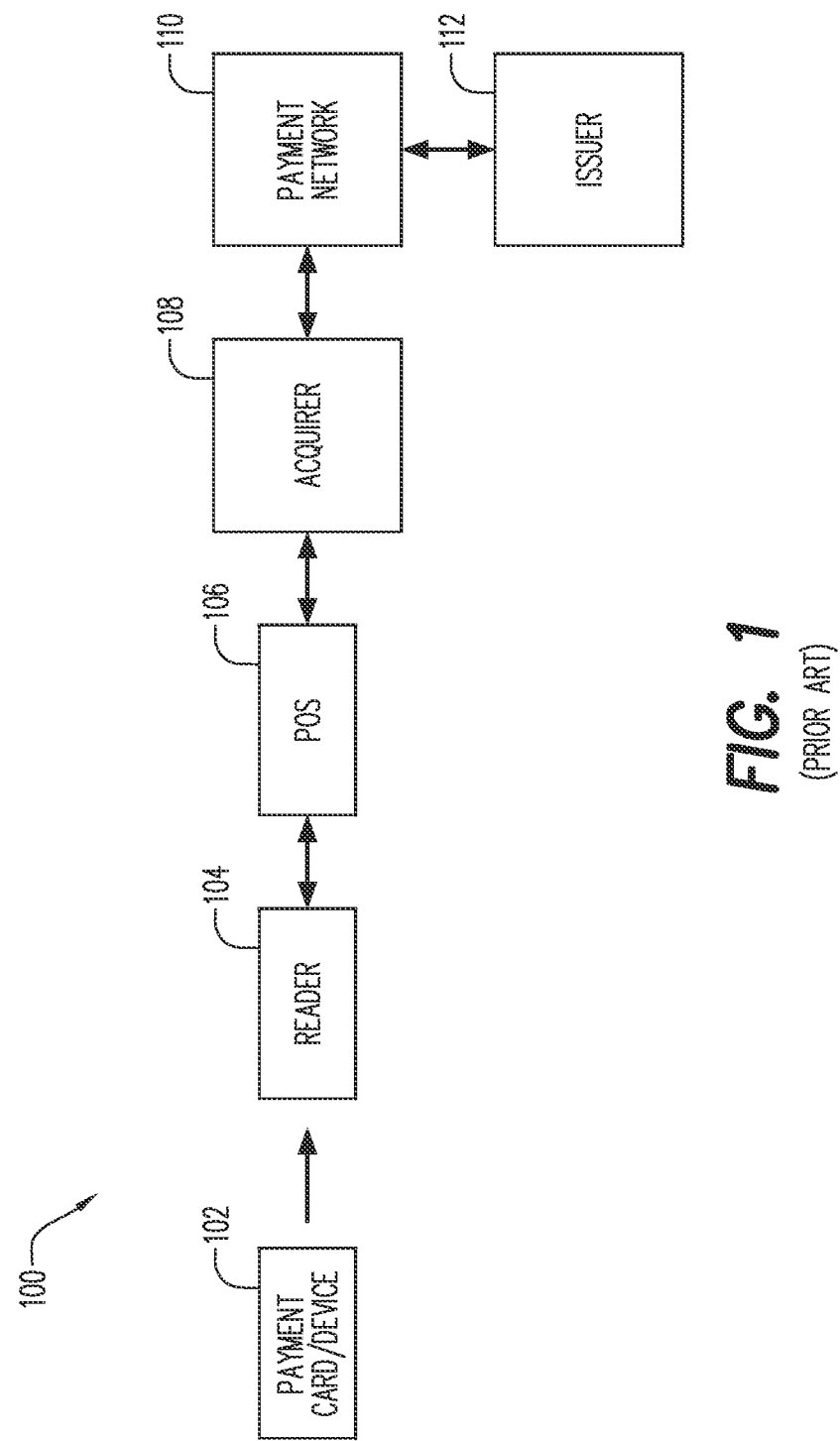
FIG. 1 is a block diagram that illustrates a conventional payment system.

In general, and for the purpose of introducing concepts of embodiments of the present invention, a two-factor authentication mechanism is provided for wallet access/payment transactions. The two authentication factors may include (a) a secret PIN known to and entered by a user of a user device such as a smartphone or a personal computer (PC); and (b) a device-specific cryptographic key securely stored in a protected manner in the user device. The second authentication factor ("something you have") may be implemented using only software security techniques, and without inclusion of a hardware-based secure element in the user device and also without installing a trusted execution environment in the user device. It is also not required for the user to have or operate a device apart from the user device while engaging in wallet access/payment transactions.

In some embodiments, the device-specific key may be encoded in a cryptographic function implemented in the user device during initialization of the payment functionality of the user device. White box cryptographic techniques may be employed to provide an appropriate level of security for the secret key in the user device. The secret key may be employed as a transport key in exchanging encrypted data communications between the user device and a wallet server during payment transactions, mainly for the importing of the Single Use Key for Authentication (SUK_AU).

In some embodiments, enhanced security may be provided by provisioning from the wallet server to the user device, at every transaction, an encrypted single-use key to be stored in the user device for being used in the next transaction. Thus the stored single-use key provides an enhanced level of a software-only "something you have" authentication factor within the user device.

In one enhanced security regime, each payment transaction includes a device authentication phase and a user authentication phase. The device authentication phase includes cryptographically hidden presentation of a session key from a preceding transaction from the user device to the wallet server and verification of the session key by the wallet service. The user authentication phase includes provision of the device authentication session key for the next transaction from the wallet server to the user device as well as the provision of the user authentication session key for the current transaction. The user authentication phase further includes entry of a secret PIN by the user, which is used in the user device to extract the session key for user authentication. The user authentication phase may further include submission, in cryptographically hidden form, of data from the user device to the wallet server, for verification by the wallet server.

The authentication techniques described herein may provide for a simple, convenient user experience during payment transactions. Further, those techniques may effect compliance with rigorous regulatory requirements relating to transaction and credentials security. Moreover, various techniques described herein may allow for an advantageous balancing of cost/resource expenditure versus the degree of security provided; other techniques described herein may afford protection against even quite sophisticated attacks against payment infrastructure, while still being cost-effective. Among other advantages, techniques described herein may leverage commercially available channels for distribution of software to user devices, while avoiding complex or difficult involvement by or engagement with device manufacturers and mobile network operators (MNOs).

By way of background, a conventional payment system will first be briefly described. FIG. 1 is a block diagram that illustrates a conventional payment system 100.

The system 100 includes a conventional payment card/device 102. As is familiar to those who are skilled in the art, the payment card/device 102 may be a magnetic stripe card, an IC (integrated circuit) card, a fob, a payment-enabled smartphone, etc.

The system 100 further includes a reader component 104 associated with a POS terminal 106. In some known manner (depending on the type of the payment card/device 102) the reader component 104 is capable of reading the payment account number and other information from the payment card/device 102.

The reader component 104 and the POS terminal 106 may be located at the premises of a retail store and operated by a sales associate of the retailer (i.e., the merchant) for the purpose of processing retail transactions. The payment card/device 102 is shown in FIG. 1 to be interacting with the reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment card account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment card issuer server computer 112 may be operated by or on behalf of a financial institution ("FI") that issues payment accounts to individual users. For example, the payment card issuer server computer 112 may perform such functions as (a) receiving and responding to requests for authorization of payment account transactions to be charged to payment accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals and associated proximity reader components. The system may also include a very large number of payment account holders, who carry payment cards or other devices for initiating payment transactions by presenting an associated payment account number to the reader component of a POS terminal In the summary portrait of the payment system 100 as set forth above, the example transaction illustrated was an in-store purchase transaction. However, as is well known to those skilled in the art, and to consumers as well, many payment account transactions are instead undertaken in connection with e-commerce transactions such as online shopping transactions. For such transactions, the merchant's role may be filled by an e-commerce server computer (not shown), which may take the place of the components 104 and 106 shown in FIG. 1. Thus the e-commerce server may initiate the transaction authorization request message that was mentioned in the prior description of FIG. 1. Also, the transaction may involve the user's operation of a device such as a smartphone that runs a mobile browser, or a personal computer, laptop computer or tablet computer, for the purpose of interacting with a shopping webpage hosted by the above-mentioned merchant's e-commerce server. The type of user device referred to in the previous sentence may effectively stand in for the item 102 shown in FIG. 1.

Figure 2:
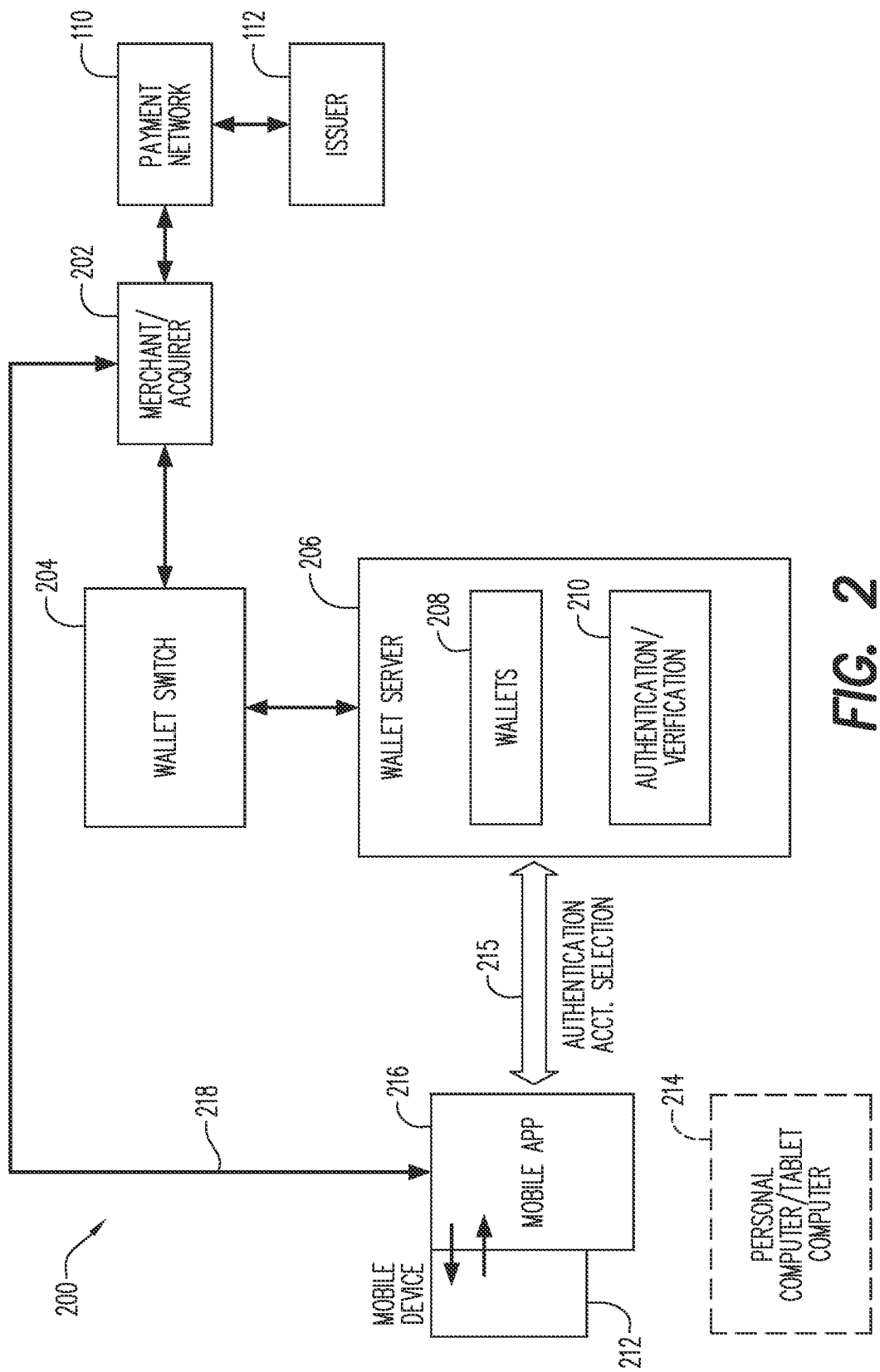
FIG. 2 is a block diagram that illustrates a payment system provided in accordance with aspects of the present invention.

FIG. 2 is a block diagram that illustrates a payment system 200 provided in accordance with aspects of the present invention. (As was the case in FIG. 1, the payment system is depicted in FIG. 2 only in terms of components needed for a single transaction; in practice, and as will be discussed below, the payment system 200 may include many more instances of at least some components.)

Like FIG. 1, FIG. 2 shows a payment network 110 and an issuer server computer 112 as referred to above. In some embodiments, these two system components may operate substantially in a conventional manner to receive and route payment account system transaction authorization requests and transaction authorization responses.

For simplicity of illustration, the merchant and acquirer aspects of the payment system 200 are represented by a single block 202. The merchant/acquirer block 202 (i.e., either a device operated by the merchant, or by the acquirer, or by a service provider for one or the other) is shown as being in communication with a wallet switch 204. The wallet switch 204 may receive a communication from the merchant/acquirer block 202 when a customer indicates to the merchant that the customer wishes to access a WSP to provide payment for a transaction. In effect, the wallet switch 204 may bring a wallet server 206 into the transaction by relaying, to the wallet server 206, transaction details that originate from the merchant. Details of the wallet server 206 will be described below. Significant aspects of the wallet server 206 include its storage of digital wallets 208 for numerous users of the payment system 200, and its functionality for providing user and device authentication services, as represented by block 210 in FIG. 2. The latter functionality may be provided in accordance with teachings of this present disclosure, and in significant respects may depart from authentication practices that have been previously proposed. It should be understood that, in addition to functioning as a wallet server, component 202 may also function as a remote authentication server.

Authentication for transactions may occur via a procedure carried out between the wallet server 206/authentication functionality 210 and a user/payment device (reference numeral 212) operated by a user who is engaging in a purchase transaction with the merchant. In FIG. 2, the user/payment device 212 is depicted as a mobile device such as a smartphone, but in other situations, for example, the user/payment device 212 may be a PC, laptop computer, tablet computer or the like that is being used, via its browser program, to access an e-commerce site for the present transaction. The non-smartphone examples of a user device 212 are represented in phantom by block 214, which in some instances may replace the user device 212 explicitly indicated in the drawing. For the particular example transaction illustrated in FIG. 2, the user device 212 is shown as engaging in an interaction 215 with the wallet server 212 via a mobile authentication app (application program) 216.

The interaction 215 between the wallet server 206 and the user device 212 may include authentication as well as selection of an account from the user's digital wallet stored in the wallet server 206. Authentication may include device authentication and user authentication, and as described below, may be implemented with a two-factor authentication mechanism operated with substantial, or even a very high degree of, rigor.

As schematically illustrated by connection 218 in FIG. 2, the mobile app 216 may effectively indicate to the merchant/acquirer 202 that the payment phase for an online shopping "basket" may be completed, where the basket total is known to the user; the mobile app 216 may also indicate that the user has selected a particular wallet brand as the preferred payment method for the current transaction.

It is worth noting that for each component shown in FIG. 2, the actual number of such components included in a practical embodiment of the system 200 may be greater than one. For example, there may be numerous merchants who participate in the system, as well as an even larger number of individuals operating user devices that are programmed for transaction authentication or other user/payment devices. There may also be a considerable number of acquirers and issuers, and perhaps a number of wallet servers and potentially more than one payment network. As will be understood from the above description of the conventional payment system 100, the payment system 200 shown in FIG. 2 may process many transactions, including simultaneous transactions.

In a typical configuration of the payment system 200, the wallet server 206 is remote from both the merchant and from the user device 212.

Figure 3:
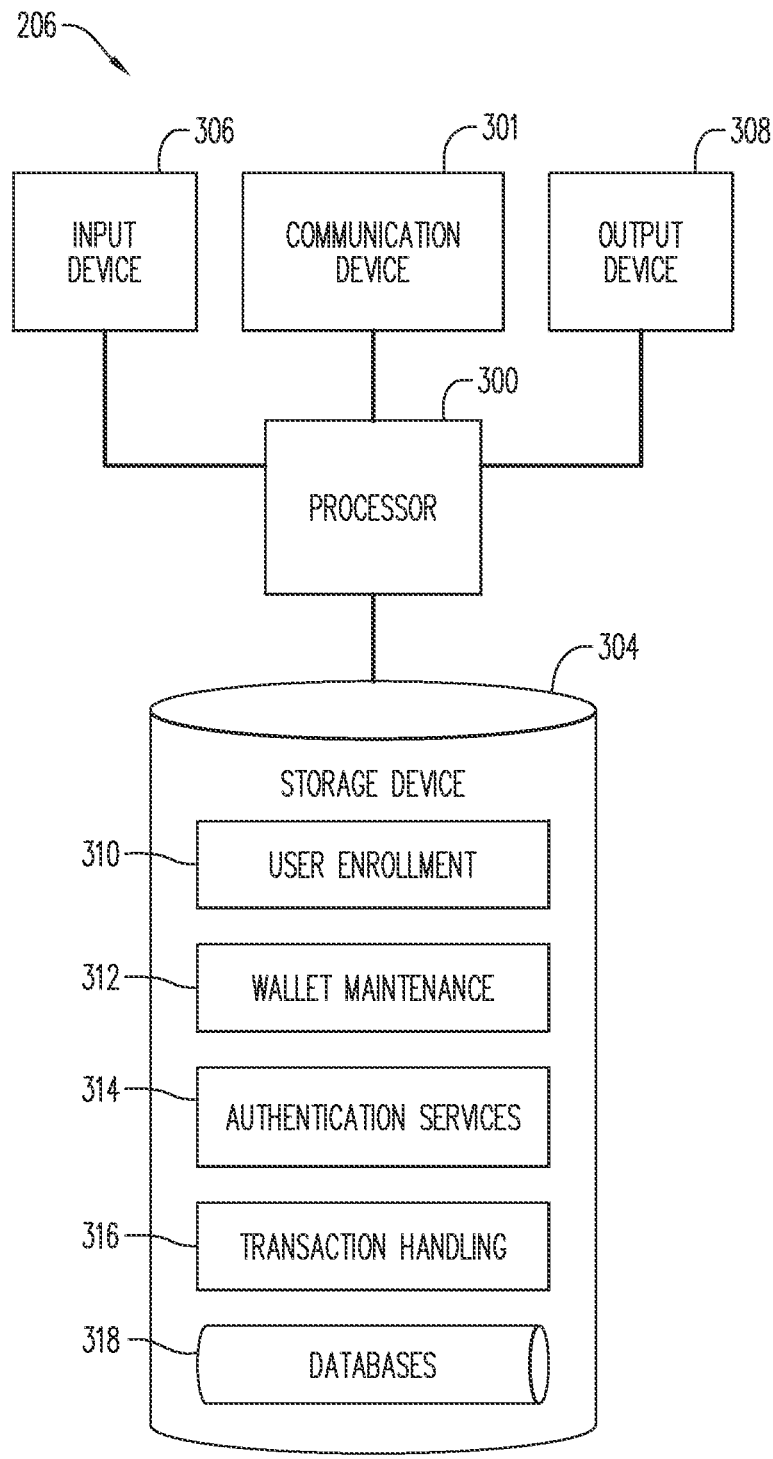
FIG. 3 is a block diagram that illustrates a computer system that may be provided as part of the system of FIG. 2 and in accordance with aspects of the present invention.

FIG. 3 is a block diagram that illustrates an example embodiment of the wallet server 206 as shown in FIG. 2 and provided in accordance with aspects of the present invention.

Referring now to FIG. 3, the wallet server 206 may be conventional in its hardware aspects but may be controlled by software to cause it to function as described herein. For example, the wallet server 206 may be constituted by server computer hardware.

The wallet server 206 may include a computer processor 300 operatively coupled to a communication device 301, a storage device 304, an input device 306 and an output device 308.

The computer processor 300 may be constituted by one or more conventional processors. Processor 300 operates to execute processor-executable steps, contained in program instructions described below, so as to control the wallet server 206 to provide desired functionality.

Communication device 301 may be used to facilitate communication with, for example, other devices (such as the wallet switch 204, and the user device 212). For example, the communication device 301 may include numerous communication ports and interfaces to facilitate communications (i) over-the-air via one or more mobile communication networks (not shown) with mobile devices operated as user devices by numerous users of the payment system 200; and/or (ii) with PCs and the like over the Internet.

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the wallet server 206, executed by the processor 300 to cause the wallet server 206 to function as described herein.

The programs may include one or more conventional operating systems (not shown) that control the processor 300 so as to manage and coordinate activities and sharing of resources in the wallet server 206, and to serve as a host for application programs (described below) that run on the wallet server 206.

The programs stored by the storage device 304 may include, for example, a user enrollment application program 310. The user enrollment application program 310 may control the processor 300 to enable the wallet server 206 to handle requests from users to enroll for wallet services provided by the wallet server 206. For example, this may include, at least in part, opening a user account on the wallet server 206 and enrolling a number of the user's payment accounts for inclusion in the digital wallet to be provided for the user on the wallet server 206. Enrollment of the user's payment card accounts may, in at least some cases, be via the PAN (primary account number) that identifies the payment card account in question and/or may be via a payment token of the type referred to in the "Payment Token Interoperability Standard" published in November 2013 by MasterCard International Incorporated, Visa and American Express.

The user's interaction with the wallet server 206 to establish the user's digital wallet may, for example, be via access to a website hosted by the wallet server 206.

The storage device 304 may also store a wallet maintenance application program 312 that controls the processor 300 to enable the wallet server 206 to store and maintain the digital wallets that have been established by users in the wallet server 206.

In addition, the storage device 304 may store program instructions 314 such as are required to allow the wallet server 206 to operate as a remote authentication server as described in detail herein.

The storage device 304 may also store a payment transaction handling program 316, which controls the processor 300 to enable the wallet server 206 to handle wallet account selection for numerous transactions referred to the wallet server 206 from the wallet switch 204. In some embodiments, the functionality of programs 314 and 316 may be combined in a single program or may encompass cooperation between related programs The storage device 304 may also store, and the wallet server 206 may also execute, other programs, which are not shown. For example, such programs may include a reporting application, which may respond to requests from system administrators for reports on the activities performed by the wallet server 206. The other programs may also include, e.g., one or more data communication programs, website hosting programs, a database management program, device drivers, etc.

The storage device 304 may also store one or more databases 318 required for operation of the wallet server 206. Such databases may include, for example, a database (not separately indicated in FIG. 3) for storing data corresponding to digital wallets and associated payment account information maintained for users/cardholders in the wallet server 206. One or more other databases—e.g., a user database for authentication purposes and a device database for authentication purposes (not shown in FIG. 3 apart from item 318)—may be employed by the wallet server 206 in connection with its authentication functions, as described below.

As noted above, a number of different types of devices, including smartphones, PCs, laptop computers, tablet computers, etc. with Internet connections may be employed as user/payment devices for wallet-based payment transactions. Given that in many instances a mobile device such as a smartphone may be employed in that role, it is worthwhile to illustrate aspects of such a device, as is done in the accompanying FIG. 4.

Figure 4:
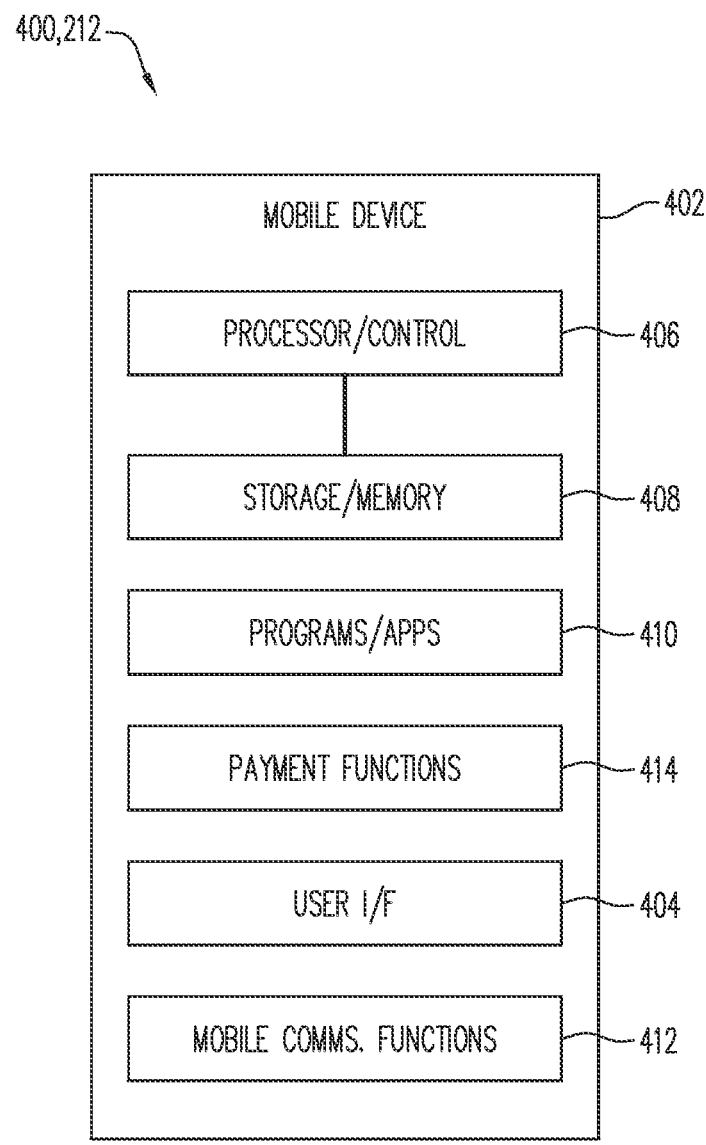
FIG. 4 is a block diagram of a mobile device that may be used in connection with payment transactions in the system of FIG. 2.

FIG. 4 is a block diagram of an embodiment of a mobile device (assigned reference numeral 400 for purposes of this drawing) that may be used in connection with payment/wallet access transactions in the payment system 200 of FIG. 2.

In one example embodiment, the mobile device 400 may be a typical smartphone in its hardware aspects and also in most software aspects, except that the mobile device 400 may be programmed suitably to allow it to interact with, e.g., a merchant device and with the wallet server 206 as described herein. In brief, the mobile device 400 may identify itself to a merchant device, and may engage in operations relative to the wallet server 206 such as device authentication, user authentication, receipt of wallet data and selection from among wallet accounts. Details of these operations will be provided below. In any event, a brief overview of salient aspects of the mobile device 400 will now be provided.

The mobile device 400 may include a housing 402. In many embodiments, the front of the housing is predominantly constituted by a touchscreen, which is a key element of the user interface 404 of the mobile device 400.

The mobile device 400 further includes a conventional mobile processor/control circuit 406, which is contained within the housing. Also included in the mobile device 400 is a storage/memory device or devices (reference numeral 408). The storage/memory devices are in communication with the processor/control circuit 406 and may contain program instructions to control the processor/control circuit to manage and perform various functions of the mobile device 400. As is well-known, such functions include operation as a mobile voice communication device via interaction with a mobile telephone network (not shown). Further conventional functions include operation as a mobile data communication device, and also as what is in effect a pocket-sized personal computer, via programming with a number of application programs, or "apps". (The apps are represented at block 410 in FIG. 4, and may in practice be stored in block 408, to program the processor/control circuit 406 in myriad ways.) The above-referenced mobile communications functions are represented by block 412, and in addition to programmed control functions, the mobile communications functions also rely on hardware features (not separately shown) such as an antenna, a transceiver circuit, a microphone, a loudspeaker, etc.

Block 414 in FIG. 4 represents features that enable the mobile device 400 to participate in the payment system 200 in ways that are described herein. This may involve, for example, a wallet app (also sometimes referred to as a payment app or payment application) that may have functionality provided in accordance with teachings of the present disclosure. It will also be seen from discussion below, that the payment functions 414 may manage the storage/memory 408 such that one or more specialized databases (not separately indicated in FIG. 4) may be maintained in the mobile device 400.

From the foregoing discussion, it will be appreciated that the blocks depicted in FIG. 4 as components of the mobile device 400 may in effect overlap with each other, and/or there may be functional connections among the blocks which are not explicitly shown in the drawing.

It has been posited that the mobile device 400 may be embodied as a smartphone, but this assumption is not intended to be limiting, as the mobile device 400 may alternatively, in at least some cases, be constituted by a tablet computer that has mobile communication capabilities or by other types of mobile computing devices. Other types of computing device, as noted above, may also be utilized as user devices in accordance with aspects of the present invention.

Figure 5:
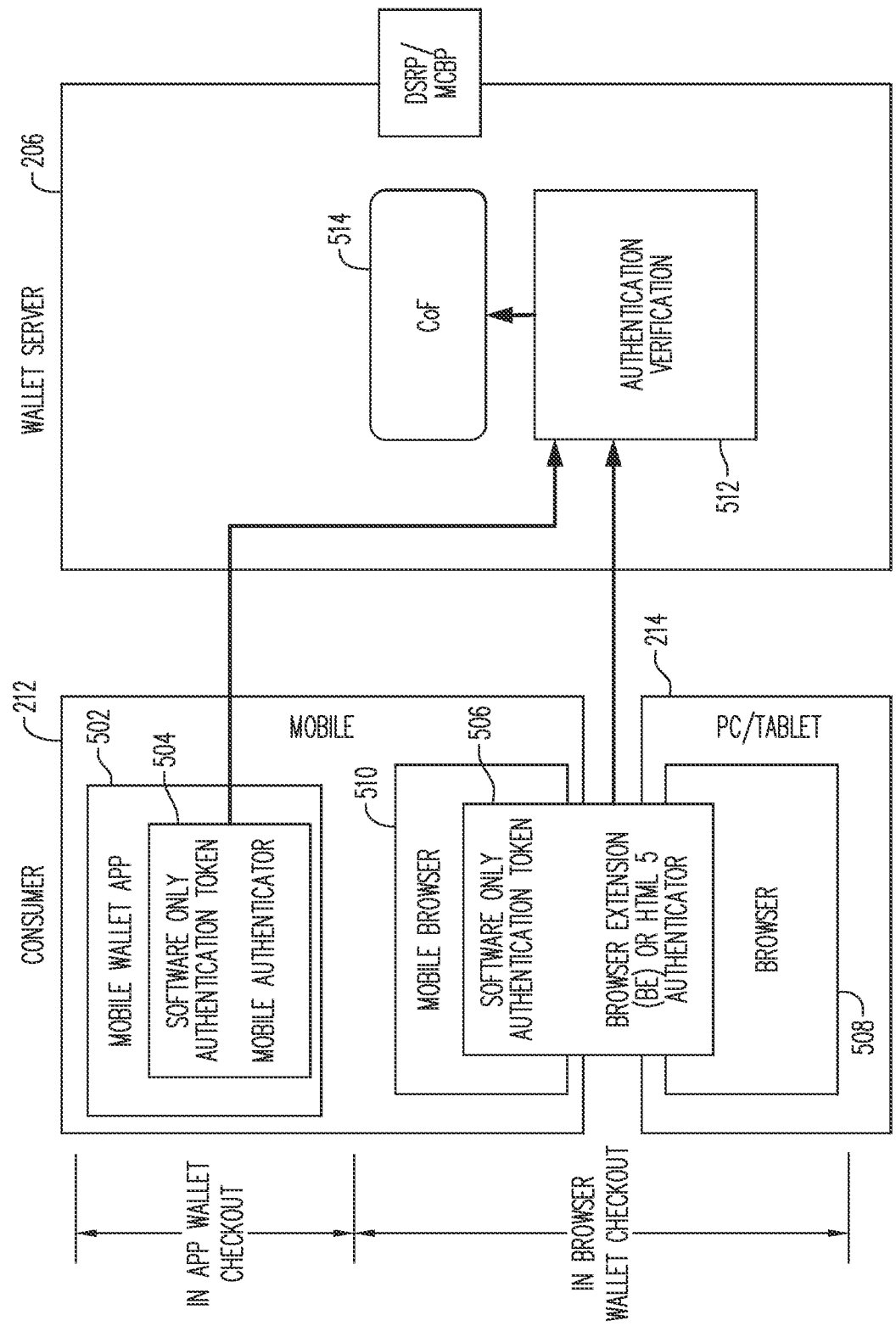
FIG. 5 is a diagram that schematically illustrates authentication functionality as implemented in the system of FIG. 2.

FIG. 5 is a diagram that schematically illustrates authentication functionality as implemented in some embodiments in the system of FIG. 2.

According to aspects of the present invention, a strong authentication method is provided between the user device 212 or 214 (actually with software entities therein) and the authentication/verification function 512 (FIG. 5) of the wallet server 206. In some respects, the architecture presented in FIG. 5 may follow the model of the DSRP (Digital Secure Remote Payment) system that has been promulgated by MasterCard International Incorporated, which is the assignee hereof. The authentication method(s) as disclosed herein may provide full compliance with regulatory regimes (e.g., the European Central Bank regime) for e-commerce payment transactions while also providing a convenient and simple experience for users and without involving—at least for each transaction—hardware elements such as an IC payment card, a personal card reader (PCR) or the like. Instead, in some embodiments, the user may only be required to use his/her IC payment card and the PCR on one occasion, that is, when adding the particular card/payment account to his her digital wallet (e.g., for compliance with European Central Bank (ECB) requirements concerning Anti-Money Laundering/Counter Terrorism Funding (AML/CTF)). In other embodiments, there may be no requirement for the user to use the IC payment card and/or the PCR on any occasion in connection with either enrollment of the payment account in the digital wallet or in wallet transactions. The authentication method(s) disclosed herein may also avoid reliance on complex infrastructure like that involved with other user authentication methods that have been proposed.

One feature of the architecture illustrated in FIG. 5 is that strong user authentication may be provided in a convenient manner for the user, i.e., in the same channel through which the shopping experience was carried out. For example, there may be provided "inApp inChannel" authentication via a mobile wallet app 502 in the mobile device 212; or, if the user device is a PC 214 or the like, the inApp inChannel authentication may be via an application program that is compatible with the operating system that runs on the PC 214. As indicated at 504, the mobile wallet app 502 may incorporate authentication functionality 504, provided according to teachings of this disclosure to implement a "software-only" authentication token in the mobile device 212.

Alternatively, according to aspects of the present invention, in either a mobile device 212 or a PC 214, an "inBrowser inChannel" authentication function may be provided, e.g., via a browser extension 506 or a web page running within the browser (e.g., PC browser 508 or mobile browser 510).

It will be noted that the authentication functionality 504/browser extension 506, as the case may be, is shown interacting with authentication/verification functionality 512 of the wallet server 206, which may also incorporate customary "card on file" (CoF) functionality 514 in providing wallet services.

With use of a software-only authentication token, it is possible to avoid the potential inconvenience or difficulty that could otherwise be involved in (a) hosting the authentication token on the SIM card provided by the MNO (i.e., no need to obtain cooperation with the MNO); (b) providing a dedicated hardware secure element (SE) for payment security purposes (i.e., reduced or no need to obtain cooperation from the equipment manufacturer); or (c) incorporating Trusted Execution Environment (TEE) circuitry in the device (again, reduced or no need to obtain cooperation from the equipment manufacturer).

Figure 6:
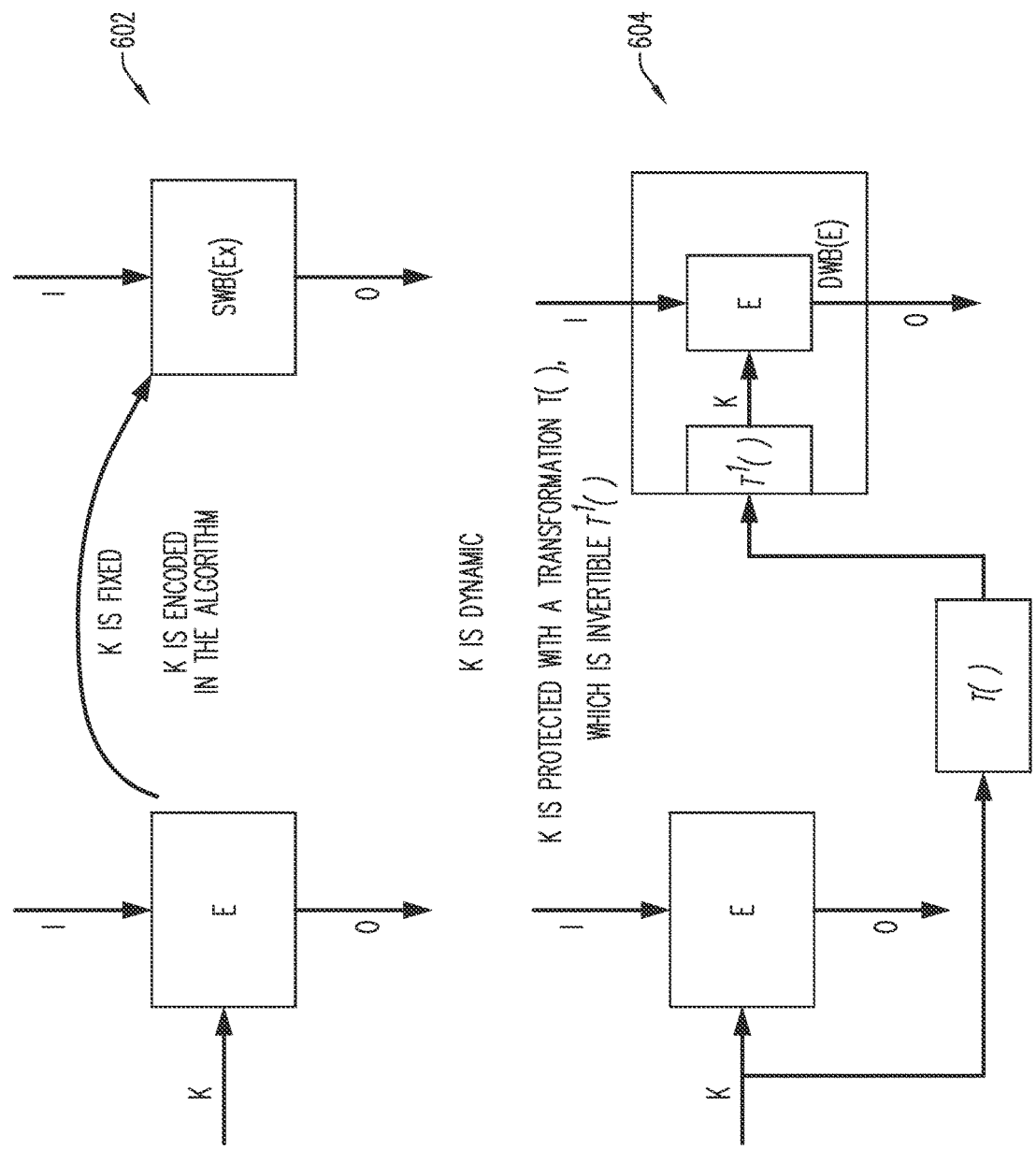
FIG. 6 is a diagram that illustrates white box cryptography approaches that may be implemented in user devices in the system of FIG. 2

Techniques that may be used to provide "tamper-resistance" to support implementation of a software-only authentication token may make use of both static and dynamic white box cryptography (WBC), as illustrated, for example in FIG. 6 (with the upper part 602 illustrating static WBC and the lower part 604 illustrating dynamic WBC).

In a static WBC implementation (part 602), a secret key K is fixed but is encoded in the block cipher structure so that it cannot be reverse-engineered by an attacker. It becomes integral to the implementation of the wallet app on compilation of the wallet app.

The lower part 604 of FIG. 6 shows a Dynamic White Box (DWB) implementation in which the key K may change on every call to the wallet app. In such an implementation the dynamic key K is passed as a parameter, but it is firstly securely transformed before being transmitted through the unprotected environment. Possible transformation types include:

Un-keyed t transformations o(K), wherein the security relies on the secrecy of the transformation itself—o(K) may be considered to be an obfuscation function. This may be implemented as an obfuscation transformation with a secret encoding/decoding table. Thus $o^{-1}(K)$ is the inverse obfuscation transformation that allows the recovery of the session key at destination, after passing the unsecure environment.

Encryption with a general purpose encryption/decryption algorithm eR (K). The generated implementation uses a key R, which is unique per user/mobile device, that is used to encrypt the dynamic key K after its generation and to decrypt it internally to the DWB(E) primitive to be used by the encryption algorithm E.

As distributed (e.g., from an "app store") to each user device, the coding may be the same for the WBC construct in each device, but subsequently the WBC construct on a particular user device may be initialized with a session transport key specific to each user. Thus, the combination of the WBC construct plus the hardware/software platform on which the particularized WBC executes may be seen as the "something you have" (i.e., ownership authentication factor).

Figure 7:
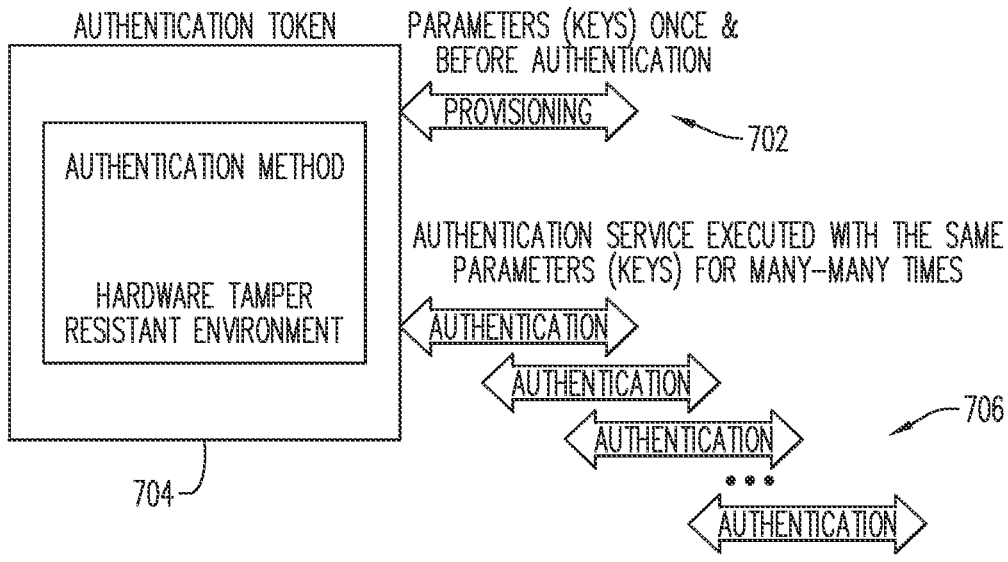
FIG. 7 is a diagram that schematically illustrates a conventional approach for provisioning of authentication credentials to a user device.
Figure 8:
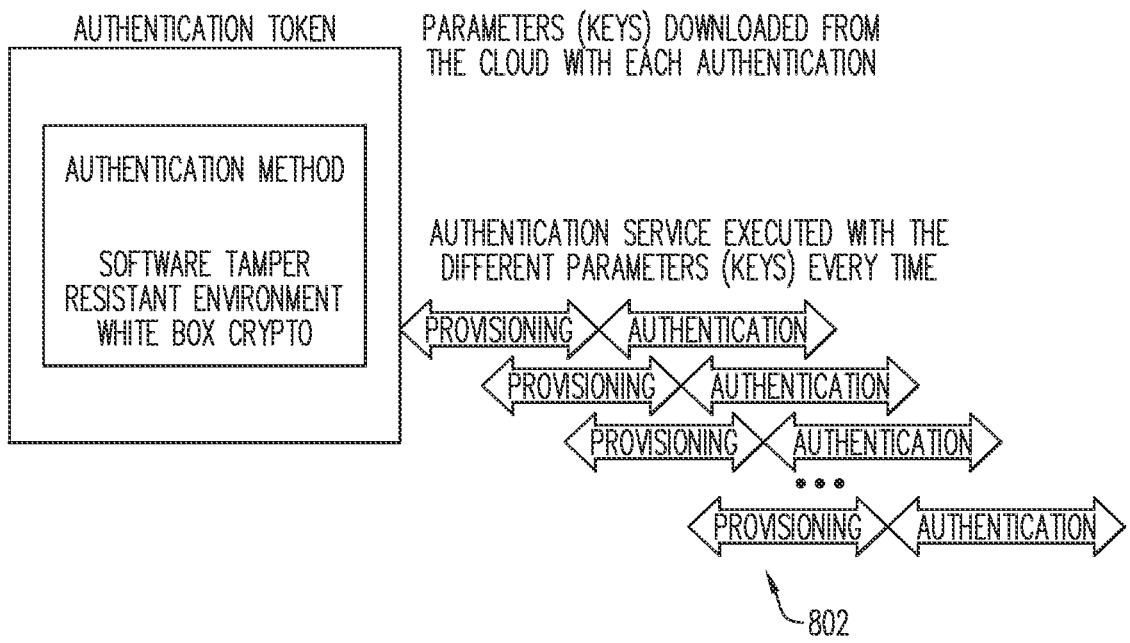
FIG. 8 is a diagram that illustrates an approach for provisioning of authentication credentials in accordance with aspects of the present invention.

Another technique that may be used to support tamper-resistance for the authentication token may be based on a provisioning approach as illustrated in FIG. 8 below, and may be built with white box cryptography techniques. Referring initially to FIG. 7, which represents a typical provisioning approach, parameters/keys are provisioned once and before authentication (as indicated at 702) for storage and use many times in a hardware tamper-resistant authentication token 704. The multiple subsequent uses for authentication with the stored parameters are indicated at 706 in FIG. 7.

By contrast, in accordance with teachings of this disclosure, and as illustrated in FIG. 8, the secret parameters/authentication keys used for authentication are freshly generated—in the "cloud"—by the wallet server authentication services functionality and provided in each session preceding the authentication itself, as indicated at 802 in FIG. 8. In addition, the secret parameters/authentication keys may be PIN or password protected, which thus provides a second authentication factor—of the "knowledge" type/"something you know".

Still further, in some embodiments, the session authentication key is never revealed in plain text within the execution environment. Rather, the session key is sandboxed together with the authentication function that is using it in the wallet app within a dynamic white box cryptographic primitive.

To satisfy some regulatory requirements or security objectives, it may be advisable to use a separate user authentication infrastructure during the phase of operations in which a card/payment account is added to the digital wallet in the wallet server, but thereafter in connection with transactions using that account data, it may not be necessary to use such a separate user authentication infrastructure.

Figure 9:
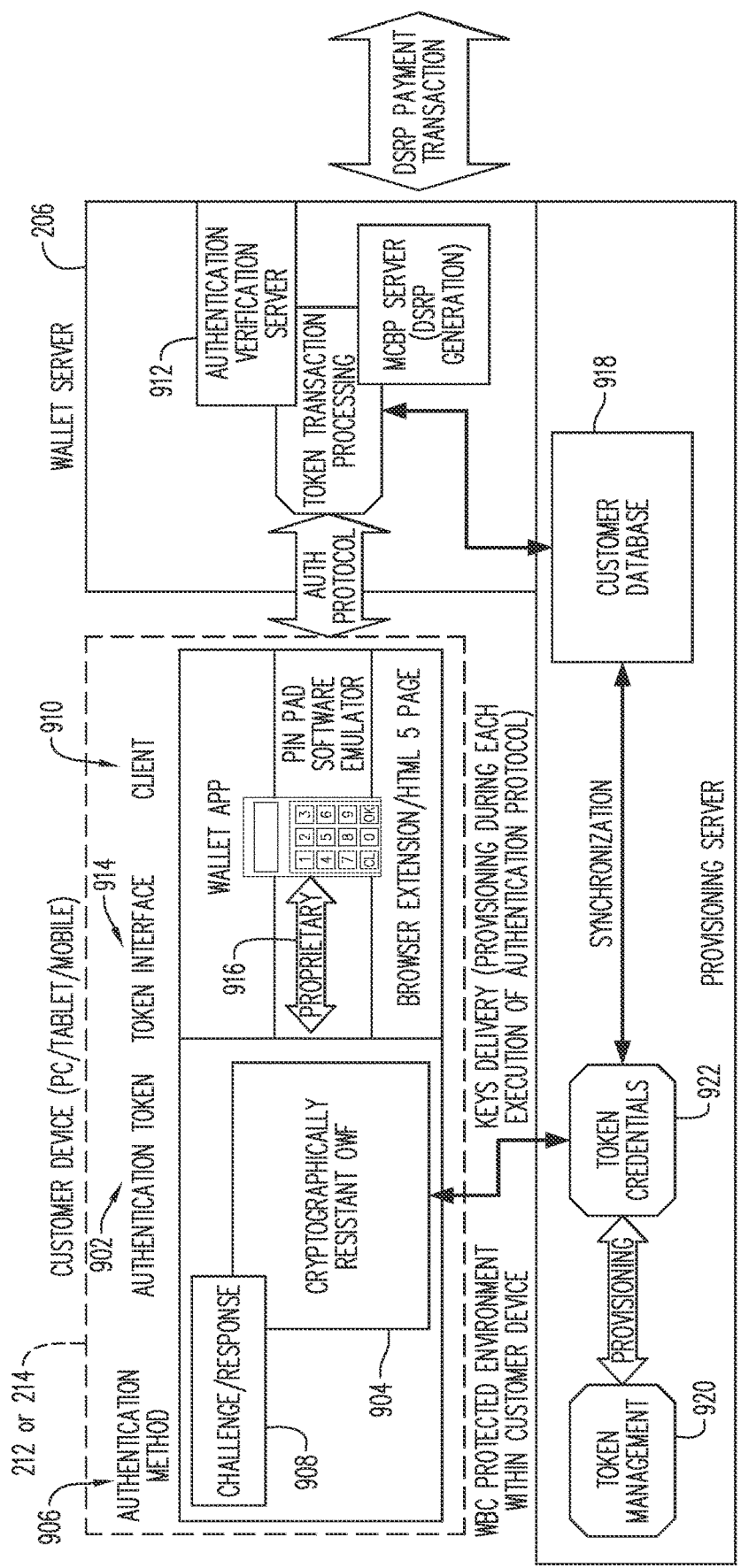
FIG. 9 is a diagram that illustrates an architecture for implementing authentication procedures in the system of FIG. 2.

FIG. 9 is a diagram that illustrates an overview of an architecture for implementing authentication procedures in the system of FIG. 2. This architecture may be suitable for providing a strong user authentication service in a server-based DSRP model, and incorporating two-factor authentication implemented exclusively in software, as identified as a preferred objective in previous discussion herein. The mechanism illustrated in FIG. 9 may be implemented in a software only environment that can be hosted in the insecure memory of a PC, a tablet computer, a smartphone, etc. The elements shown in FIG. 9 are explained below according to the OATH (Initiative for Open Authentication) framework.

Referring now to FIG. 9, the authentication token (reference numeral 902) may be implemented with a cryptographically resistant One Way Function (OWF) 904 in a software tamper-resistant environment created with dynamic white box cryptography. The authentication method (reference numeral 906) may be implemented with a challenge/response protocol 908 with the client application 910. The client application 910 may be a transparent proxy between the OWF 904 in the authentication token 902 and the authentication verification server function 912 in the wallet server 206. The client application 910 may, for example, be implemented as a mobile wallet app or a PC-type application compatible with a conventional PC operating system; or on a browser extension or an HTML5 web page served to a PC/tablet/mobile browser.

The token interface (reference numeral 914) may be, for example a proprietary API (application programming interface)—reference numeral 916—that emulates, for example, the EMV protocol (and its APDUs—application protocol data units), or alternatively may be any other API that allows implementation of the authentication method 906.

Web service may be implemented via the wallet server 206 to provide to the user access to his/her checkout data/card-on-file in the customer database 918, after proper authentication by the authentication verification server function 912, where the server function 912 has verified an "authenticator" (i.e., a data entity) communicated to the server function 912 from the authentication token 902.

Provisioning and management service in the architecture of FIG. 9 may include a token management entity 920 associated with the wallet server 206. The token management entity may generate and store a unique token master key for authentication (TMK_AU) for each authentication token 902 enrolled in the system. The provisioning and management service may further include a token credentials entity 922 which derives a fresh session key for authentication—denoted SK_AU—from the token master key TMK_AU with each authentication session.

In subsequent discussion, there will be descriptions of two or more specific mechanisms for implementing the authentication token 902 and the authentication method 906.

A relatively simple user authentication model according to teachings of this disclosure is illustrated in FIG. 10. The model of FIG. 10 includes provisioning (reference numeral 1002) a key and/or other parameter for user authentication, plus the user authentication itself (reference numeral 1004). A description of this model includes discussion below of FIGS. 12-14.

An authentication model with enhanced security features according to other aspects of this disclosure is illustrated in FIG. 11. The model of FIG. 11 may protect against a wide range of attacks, such as user impersonation, device identity theft, reinforced encryption, etc. The latter model includes provisioning (reference numeral 1102) a key for user authentication, further provisioning (reference numeral 1104) a key for device authentication at the next user authentication session, and authentication (reference numeral 1106) of both device and user, with the former authentication using a key from a previous session and the latter using a key from the current session. A description of the model of FIG. 11 includes discussion below of FIGS. 15-19.

Figure 12:
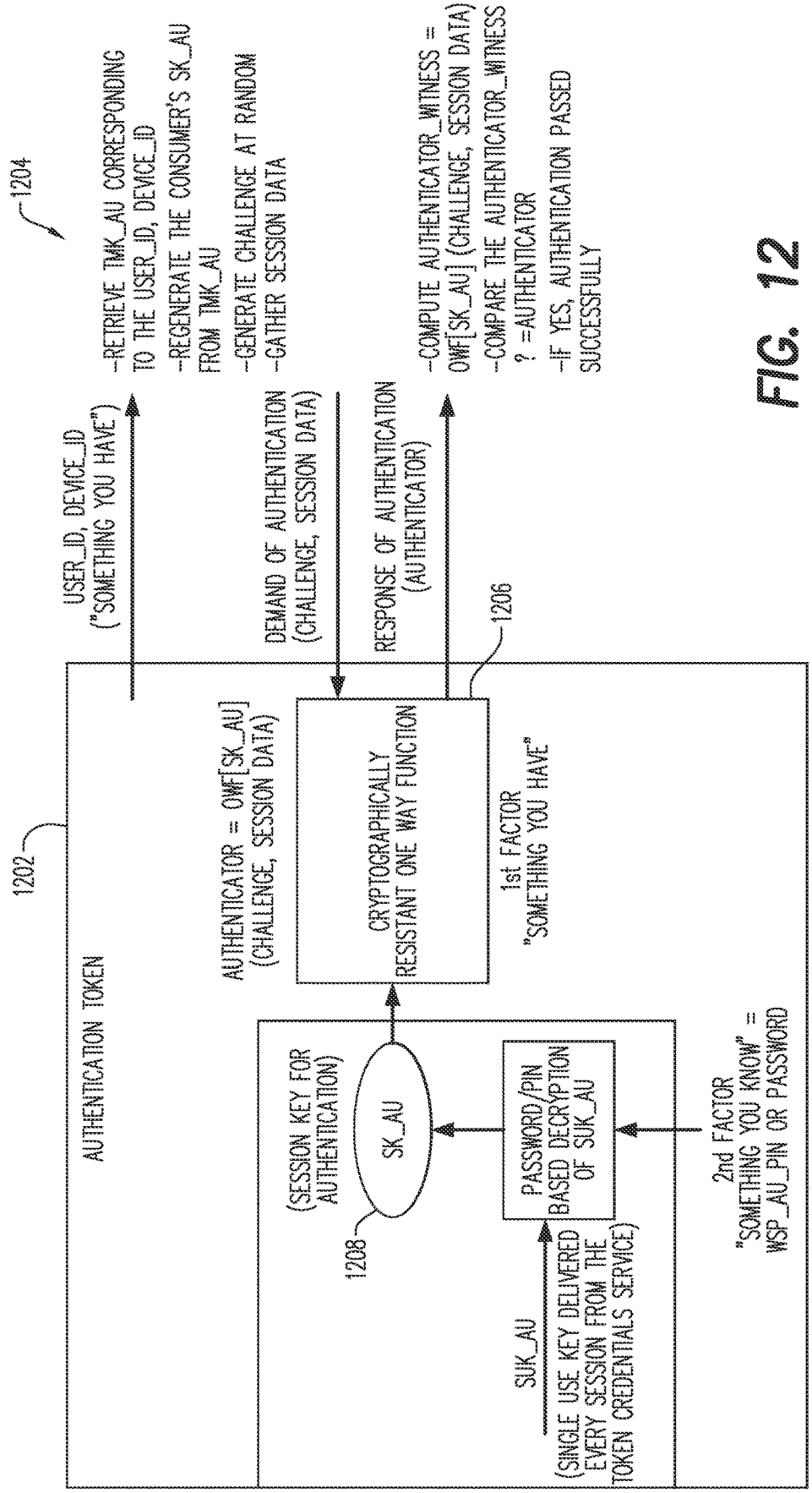
FIG. 12 is a diagram that illustrates a structure and process for handling user and device authentication in some embodiments of the system of FIG. 2.

FIG. 12 is a diagram that illustrates interaction between an authentication token (software-based) 1202 and an authentication verification server 1204 to implement the authentication model briefly referred to above in connection with FIG. 10.

Continuing to refer to FIG. 12, a structure of the authentication token 1202 will now be described.

The authentication token 1202 may include an authenticator generator, which may take the form of a cryptographically resistant one way function (OWF) 1206. The OWF 1206, serving as the authenticator generator, produces an authenticator (a data entity for submission to the authentication verification server 1204) to be used in assessing the authenticity of the user. The OWF/authenticator generator 1206 may compute the authenticator according to the formula:

Authenticator=OWF[SK_AU, Token Profile](Challenge, Session Data, Token Data)

The OWF may be implemented with a mathematical function $f$ as described at a later portion of this disclosure. The function may be parameterized with a cryptographic key and a token profile, as described below. The OWF takes authentication data as input, and produces the authenticator. Details of examples of the authentication data are described in a table at a later portion of this disclosure. In some embodiments, the authentication data always includes a fresh challenge value produced by the authentication verification server together with session data gathered from a connection established between the client and the authentication verification server.

The token profile referred to in the previous paragraph may contain personalization data for the authentication token, which is specific to the particular user. This personalization data may include a token identification number (TIdN), which may be a unique number identifying the authentication token in question within the technical and administrative boundaries of the wallet server and/or the operator of the wallet server.

The personalization data may further include an expiration date, which is the date when the token will cease to be recognized as valid in the authentication system.

The personalization data may further include token attributes, which may describe specific conditions within which the authentication token can be considered for validation (i.e., from which type of device it is generated, in which type of transactions it can be used, etc.)

In some embodiments, there may be two different types of token profiles. For example, there may be a token profile "TP-MA", which may correspond to a mobile wallet app with authentication token features and which may be designated with TIdN1; and there may be a token profile "TP-BE", which may correspond to a browser extension or web page with authentication token features and which may be designated with TIdN2.

Still further, the authentication token may include a key container, which may be used for parameterization of the OWF with a cryptographic key. The cryptographic key is represented by the label SK_AU (reference numeral 1208) in FIG. 12 and may be referred to as an authentication session key.

As an alternative to having the key container permanently storing a "card master" key (which could be diversified at each transaction), instead the key container may be provided with a fresh single-use key for authentication (SUK_AU) by the token credentials service of the wallet server at the beginning of every user authentication session (as schematically illustrated above in FIGS. 8 and 10). This may be an appropriate manner of addressing potential lack of security in the software-only environment of a mobile (wallet) app or browser extension/web page.

In some embodiments, the SUK_AU—as produced by the token credentials service—may not be used directly as a cryptographic key by the OWF, but instead may be combined with a PIN or password typed into a PIN pad software emulator portion of the client software by a user, in order to produce the session key SK_AU.

In some embodiments, the OWF may have characteristics as described below.

A cryptographically resistant one-way function f may have the following features: (a) The description of f is publicly known; (b) Given the input x, it is easy to compute $f(x)$, while for all images y in the range of f it is computationally unfeasible to derive an input x such that $y=f(x)$ (this feature is sometimes called first pre-image resistance); (c) Even though there are arguments $x \neq x'$ for which $f(x)=f(x')$, given a pair $(x, f(x))$, it is computationally unfeasible to find $x'$ such that $f(x)=f(x')$ (this feature is sometimes called second pre-image resistance); (d) It must be computationally unfeasible to find any arguments $x \neq x'$ for which $f(x)=f(x')$, in which case the function is said to be collision resistant.

One or more of these features may tend to be effective in protecting against external attackers, who can only observe the pairs $(x,f(x))$ but cannot influence the choice of x. One or more of these features may tend to be effective in protecting against inside attackers, such as a dishonest user who would subsequently attempt to disclaim a transaction for which the user in fact was authenticated.

In some embodiments the OWF may be selected either to be an un-keyed function or a keyed function with a symmetric key.

In some embodiments, an OWF as an un-keyed function may be implemented as follows.

The function f may be chosen as an un-keyed function, i.e., where there is no cryptographic key required to parameterize the function. The user's secret information (whether a session key or directly a password) may be passed directly in the arguments of the function f, i.e., Authenticator=f[SK_AU](Challenge, Session Data)=H(SK_AU, Challenge, Session Data).

Usually, in this category one may choose a hash function H. The basic idea of using a hash function for implementing the entity authentication service is to transfer the authenticity of an arbitrarily long set of attributes to the authenticity of its hash code.

Two examples of an un-keyed OWF are: (1) An HMAC-Based One-Time Password Algorithm [HOTP] proposed by the OATH consortium; and (b) an SHA-256 based hash function.

In some embodiments, an OWF as a secret symmetric keyed function may be implemented as follows.

When the function f is a Message Authentication Code (MAC) the authenticity of data relies on the secrecy and authenticity of a secret key SK_AU, which guarantees the origin of data.

One often used example of a secret symmetric keyed function is a function used in the well-known EMV payment transaction protocol. This is commonly referred to as an Application Cryptogram, which is generally abbreviated as AC:

Authenticator=AC=MAC[SK_AU](Challenge, Session Data)

This is a DES-based MAC with a symmetric key of 56 bits usually referred to as a session key $SK_{AC}$. This is the result of a key derivation from a master key per application referred to as $MK_{AC}$.

The client of the user device, the authentication token and the authentication verification server may engage in a challenge/response authentication method to fulfill the user authentication service. This may be performed as follows.

The client may submit the User_ID, which uniquely identifies the user in the wallet server's user database. The client may also submit the Device_ID, which uniquely identifies the user's device in the device database; i.e., may uniquely identify the device used by the user to authenticate to the wallet server.

Based on the User_ID/Token_ID, the authentication verification server retrieves the token master key for authentication (TMK_AU) and uses it to generate the user authentication session key (SK_AU) for the current execution of the authentication protocol. The session key will be used for verifying the authenticator provided by the user device.

The authentication verification server produces a fresh challenge value (e.g., a randomly or pseudo-randomly generated value) and gathers the current authentication session data exchanged over the connection with the user device's client. All of this data is submitted to the client, which issues a demand of authentication command with the challenge and session data as parameters to the authentication token.

The client also provides the user device with a PIN pad software emulator so that the user is prompted to type in the user's secret knowledge, i.e., a PIN or password.

After the user types in the PIN/password, the single-use key for authentication (SUK_AU) received from the token credentials service of the wallet server—during the same session—may be decrypted to produce the authentication session key (SK_AU) to be used in the production of the authenticator. The authenticator is to be transmitted as a response to the authentication verification server's challenge in the challenge/response authentication mechanism.

The authenticator as computed/calculated by the authentication token is transmitted through the user device's client to the authentication verification server.

The authentication verification server may retrieve the previously derived session key SK_AU to compute/calculate an authenticator_witness over the session data and the challenge and to compare the authenticator_witness with the authenticator received from the user device. If the authenticator_witness matches the authenticator, the authentication is considered successful and the user is allowed to access the wallet partition containing the user's card-on-file wallet data.

The authenticator computation may be performed in the following manner.

The authenticator generator uses the SK_AU to compute the authenticator AU_Cr to be sent to the token transaction processing entity of the wallet server for verification by the authentication verification server:

AU_Cr=MAC(SK_AU)[Auth_Data]

The authentication data (Auth_Data) may, for example, include one or more of the data elements shown, with their configurations, in the following table:

| | | |
|---|---|---|
| Amount, Authorized (Numeric) | '000000000000' | 6 |
| Amount, Other (Numeric) | '000000000000' | 6 |
| Terminal Country Code | '0000' | 2 |
| Terminal Verification Results | '0000000000' | 5 |
| Transaction Currency Code | '0000' | 2 |
| Transaction Date | '000000' | 3 |
| Transaction Type | '00' | 1 |
| Unpredictable Number | RAND as sent by the wallet server | 4 |
| Application Interchange Profile | AIP personalized in MPP Lite[AU] | 2 |
| Application Transaction Counter | ATC kept in MPP Lite[AU] | 2 |
| Card Verification Results | 'A50000000000' | 6 |

In some embodiments, depending on whether or not the Amount and the Transaction Currency Code are provided by the authentication verification server, those data items may be presented with values different from zero in the Auth_Data.

In some embodiments, the Au_Cr may be sent in the tag '9F26' of the response to the first Generate AC command.

In some embodiments, the MAC function may be implemented as the EMV cryptographic primitive as defined for the EMV payment transaction protocol.

Figure 13:
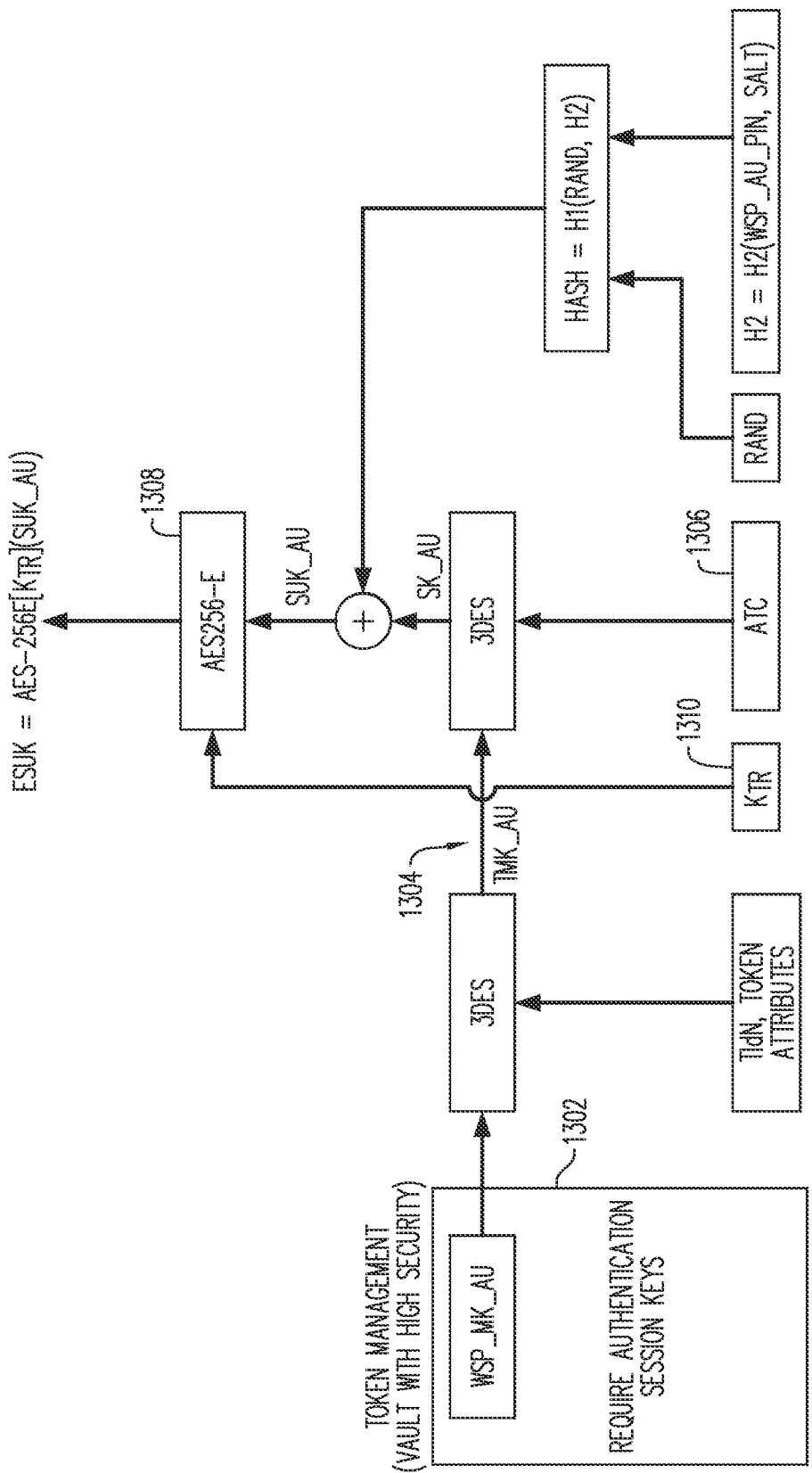
FIG. 13 is a diagram that illustrates a process by which single-use keys are generated for purposes of an authentication process in the system of FIG. 2.

FIG. 13 is a diagram that illustrates derivation and secure transmission of authentication session keys in accordance with some embodiments. One input for the process/computation illustrated in FIG. 13 is WSP_MK_AU (reference numeral 1302), which is a dedicated system master key for the authentication service, as maintained by the wallet service provider (i.e., by the operator of the wallet server).

The WSP_MK_AU system key is diversified to a token master key for authentication (TMK_AU; reference numeral 1304) for each authentication token with a dedicated TIdN that may be allocated from special BIN (bank identification number) ranges reserved for authentication purposes by the wallet service provider in agreement with, e.g., a tokenization/digitization service. The token attributes may also be included in the diversification data.

The authentication session key SK_AU for the authentication of the user toward the wallet server may be generated from the TMK_AU by using the authenticator transaction counter (ATC; reference numeral 1306) of the authentication token as a diversifier. The ATC is incremented at each authentication session, and the authentication verification server keeps this value in synchronism with the authentication token for each User_ID/Device_ID. In some embodiments, the known EMV CSK session key algorithm may be used.

The SK_AU is combined with a hash value to generate a single-use key for authentication (SUK_AU) using the function FnH as described below. In some embodiments, the SUK_AU, rather than the SK_AU itself, is transmitted to the authentication token.

Correspondingly, a SUK_AU received by the authentication token will be combined with a hash value to retrieve the initial SK_AU using the function FnH in a manner described below.

The hash value may be computed according to the formula

HASH=$H$1[RAND, $H$2(WSP_AU_PIN, SALT)]

where:
WSP_AU_PIN is a 4-6 digits long PIN used by the user for authentication to his/her checkout resources/CoF. The WSP_AU_PIN can be seen as a "decryption" key known only by the user, which is provided as a proof of his/her knowledge for allowing the recovering of SK_AU (from SUK_AU), to be used for the production of the Authenticator.

SALT is a diversifier generated automatically at PIN registration or PIN change for each user. It is used to increase the difficulty of brute force attacks on the "salted PIN" table of wallet server. The "salted PIN" table includes a field H2(WSP_AU_PIN, SALT) for each user's record in the user database.

The single-use key SUK_AU is transmitted from the token credentials 922 (FIG. 9) to the user's mobile app or browser extension/web page. In this regard, the SUK_AU is encrypted with an AES 256-E encryption algorithm (reference numeral 1308, FIG. 13), using a transport key specific to the user device and indicated as $K_{TR}$ (transport key; reference numeral 1310), in accordance with the following:

ESUK=AES256-E[$K_{TR}$](SUK_AU)

In some embodiments, the transport key $K_{TR}$ is not generated in the token vault through a derivation process specific to the wallet service provider; rather, the transport key may be generated at random during the initialization stage by the user's mobile app/browser extension/web page and securely sent to the wallet server and updated in the user database as a transport service key.

In some embodiments, security parameters for production of the authentication session key may be as follows:

H2=SHA-256
H1=A truncated output on 4 bytes of the SHA-256.

A function FnH(nKey,H1) is used to support the following translation of the SUK,AU from the SK_AU key and a H1 value of 4 bytes.

The input is:
H1 represented as hexadecimal value (up to 8 nibbles) and a 16-byte data block
nKey denotes the 16 byte data block of the key to be transformed
The output is a 16-byte data block.
The function is coded as follows

```
for(i=0; i < H1Length; i++)
{
nKey[i] ^= (sH1[i] << 1); // Left part of the key
nKey[(i+8)] ^= (sH1[i] << 1); // Right part of the key
}
``` where:
^ is the XOR operator
<<1 is a one bit shift left (Byte-based)
[i] is the ith byte of a variable
H1Length is the length (=number of digits=8) of H1
sH1 is the ASCII representation of the H1 value The following passage of this disclosure relates to provisioning of authentication session keys.

The token credentials block 922 (FIG. 9) of the provisioning server function of the wallet server 206 may use a secure channel with encryption to provide the authentication token with the SUK_AU for the execution of each and every authentication session.

To this end, each authentication token may be initialized with a specific transport key $K_{TR}$ such that the authentication token is able to correctly decrypt the encrypted ESUK values as received from the provisioning server using and AES 256-I block cipher in decryption mode.

SUK_AU=AES256-I[$K_{TR}$](ESUK)

The following passage of this disclosure relates to a dynamic white box cryptography implementation of the computation of the authenticator.

As discussed above, in some embodiments, the implementation of the computation of the authenticator (AU_Cr) may be performed in an "app". The app can be:
A generic mobile transaction application downloaded from an application store;
A browser extension downloaded from a web store;
A HTML 5 web page downloaded from a secure server.

Figure 14:
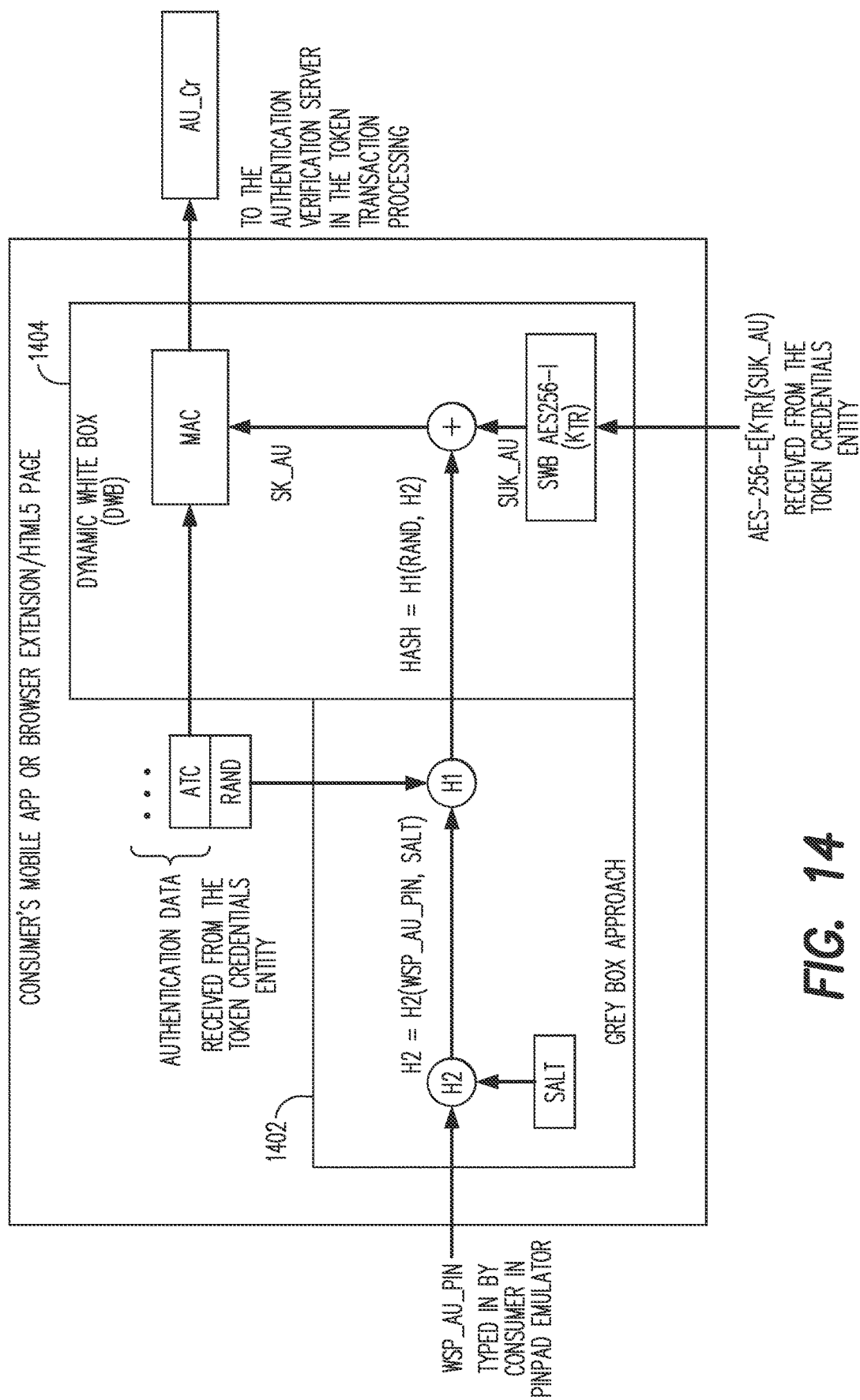
FIG. 14 is a diagram that schematically illustrates white box cryptography techniques employed in a user device in the system of FIG. 2.

For implementing the software-only security of the app, one may use the superposition of two software components, as presented in FIG. 14. In the arrangement shown in FIG. 14, authenticator computation is performed in the authentication token with combined grey box and DWBC (dynamic white box cryptography). Aspects of both the grey box (reference numeral 1402, FIG. 14) and the DWB 1404 (FIG. 14) are described below.

At the foundation of the entire app, one may use a grey box approach through software obfuscation for protecting the overall software, the cryptographic constructs (including the DWB), and the sensitive operating parameters, like SALT while stored in the app, and the WSP_AU_PIN while typed in the PIN Pad software emulator of the client and transmitted to the app, or even the WSP_AU_PIN stored in the app for a highly convenient and streamlined user experience with no PIN Pad emulator displayed, but just with a "touch" for triggering the action. Nevertheless, no cryptographic keys are left under the grey box only protection; rather they are subject to a second level of protection with the DWB cryptographic construct explained below.

The software-only security components of the app may also include a dynamic white box (DWB) cryptographic construct such as that schematized in part 604 of FIG. 6, wherein the transformation T( ) is a symmetric key decryption primitive.

In some embodiments, the same generic app could be used to achieve an SWB security level (lower) or a DWB security level (higher), dependent on whether or not user initialization of the app takes place, or whether or not it is supported by the user device:

The decryption algorithm may be implemented with a Static White Box (SWB) AES 256-I algorithm, which encodes a unique system key $K_{SYS}$. In this case, the implementation is at the SWB security level, wherein a system wide key is disseminated in all user devices, but with the advantage of it not being necessary to engage the user and the wallet server in an initialization phase.

If during an initialization stage performed by the user on the app in combination with the wallet server/WSP, the $K_{SYS}$ of the SWB AES 256-I is replaced with a device or user specific transportation key $K_{TR}$, an augmented security level at the DWB may be provided.

An advantage of the DWB is that after the change of the system key $K_{SYS}$ to the specific user transport key $K_{TR}$, randomly generated by the app, this may prevent an attacker from making an effective code or data lifting attack even if grey box protection is circumvented, as the attacker will not be able to replicate the relevant processes on his or her own hardware because key $K_{TR}$ will not be available.

With this arrangement, the DWB construct becomes user/device specific with respect to a randomly generated key $K_{TR}$ in the user device during the initialization process, which will be used as a transport key for the bringing of the sensitive authentication session keys from wallet server into the app. The basic principle of operation is that the mobile transaction application is instantiated with a random key $K_{TR}$ only at the time the initialization procedure is called. This key will be used as a transport key in the hostile environment to carry over the SUK_AU key in an encrypted form ESUK from its generation in the token credentials server function of the wallet server until its use for the MAC computation of the Authenticator. The DWB implementation then performs a decryption to retrieve the SUK_AU, and further on an FnH transform with HASH=H1[RAND, H2(WSP_AU_PIN, SALT)] to retrieve the SK_AU.

In some embodiments, a mobile fingerprint or other device specific data may be employed in initializing the grey box and/or DWB portions of the authentication token structure.

As an alternative—in some embodiments—to the server-based security for production of a dynamic key for the DWB, as described herein, the dynamic key for the DWB may be generated from a clock function in the user device. In either case, the dynamic key may be stored in a local encrypted database (also referred to as a "database encrypted" or "DBE") as described herein.

The following discussion relates to embodiments of the payment system 200 in which enhanced security measures are provided.

Figure 15:
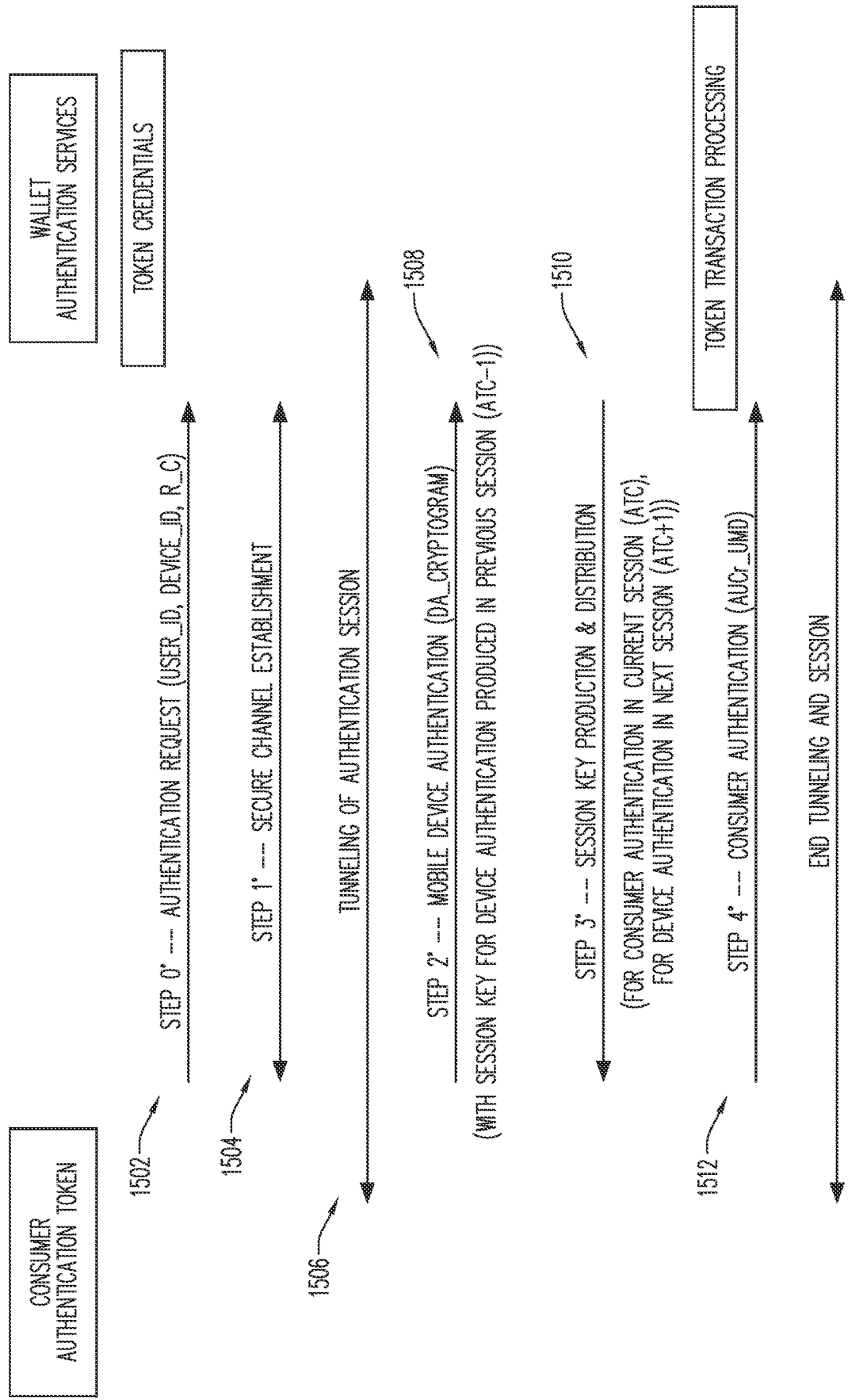
FIG. 15 is a diagram that provides an overview of a user and device authentication process according to other embodiments of the system of FIG. 2.

FIG. 15 provides an overview of a transaction flow for a highly secure user authentication process. More detail will be provided below, but at a high level, the process flow includes (a) an authentication request (reference numeral 1502) from the authentication token to the wallet server (authentication services); (b) establishment (reference numeral 1504) of a secure communication channel between the authentication token and the wallet server, and (c) a tunneling authentication session (reference numeral 1506) that includes (i) a device authentication stage 1508; (ii) production and transmission (from the wallet server to the authentication token) of session keys, as indicated at 1510; and (iii) a user authentication stage 1512.

A discussion of details of the secure channel establishment, device authentication, session key production and distribution, and user authentication now follows.

The transaction flow as shown in FIG. 15 starts with authentication of the token credentials server by the authentication token, followed by establishment of the secure channel between the token credentials server and the authentication token. In this stage, the authentication token plays the role of a client, while the token credentials server plays the role of the server.

Figure 16:
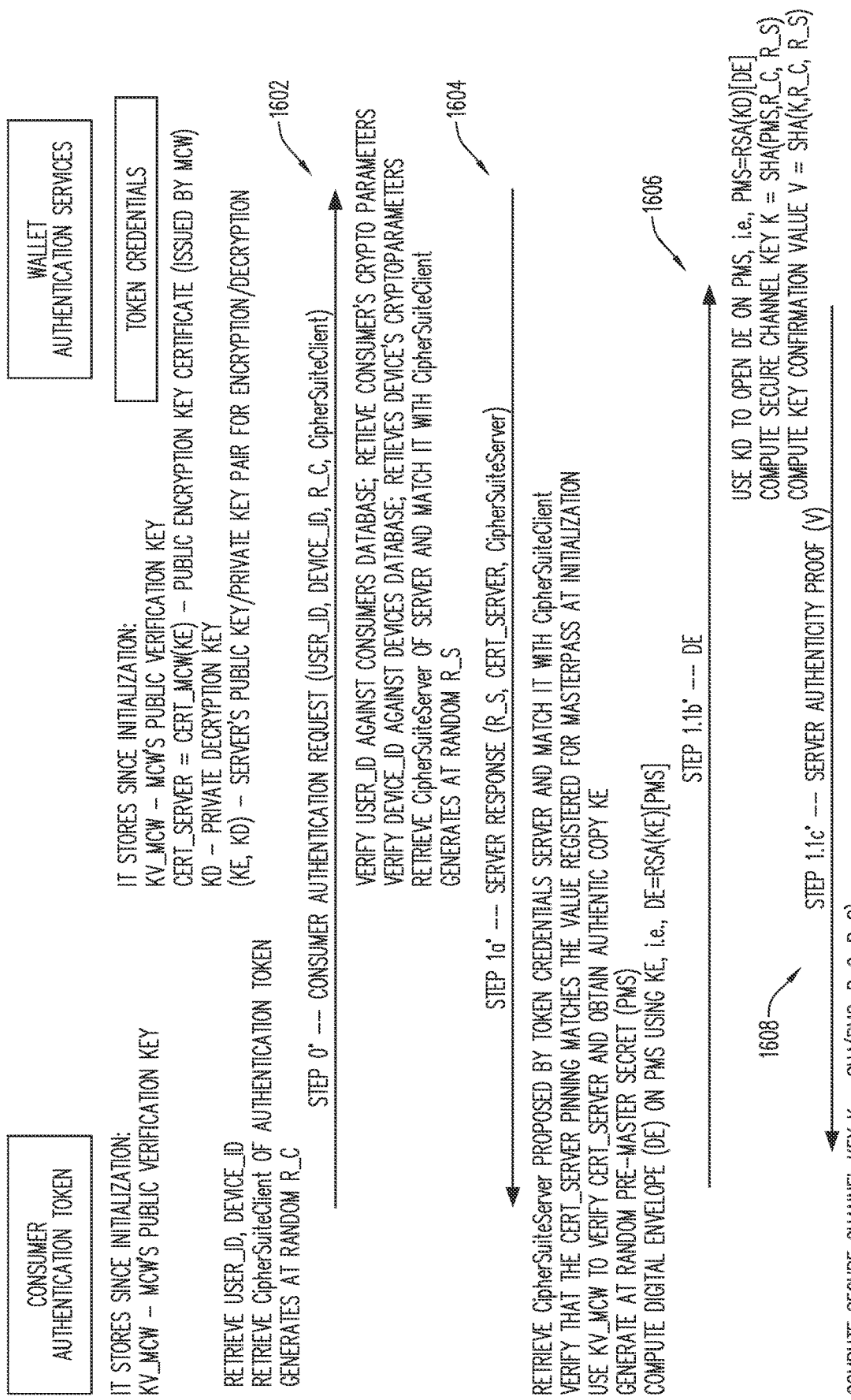
FIG. 16 is a diagram that provides details of initial stages of the process of FIG. 15.

The TLS (transport layer security) handshake protocol allows the server to authenticate to the client. It also allows the negotiation of a symmetric encryption algorithm, with the corresponding cryptographic keys. The negotiated keys are made available to the record protocol operation for any connection established during a secure session between the client and the server. The handshake protocol is described below with elements that may be required by the authentication mechanism of this disclosure, and is schematically illustrated in FIG. 16.

In some embodiments, a payment network operator (denoted as "MCW" in the drawing and in ensuing discussion) may serve as a certification authority trusted by both the authentication token and the token credentials server.

The Authentication Token is initialized with the KV_MCW-MCW public verification key.

In its turn the Token Credentials is initialized with:
KV_MCW-MCW public verification key
Cert_Server=Cert_MCW (KE)—the public encryption key certificate issued by MCW for the Token Credentials server
KE—Public encryption key of the Token Credentials server
KD—Private decryption key of the Token Credentials server In the first stage of the handshake protocol, the user's Authentication Token and the Token Credentials server in the wallet server infrastructure engage in a slightly adapted TLS handshake protocol as follows:

Step 1602—The Authentication Token forwards an Authentication Request to the Token Credentials server. As parameters of this command it provides:
The identifier of the user in the user database (User_ID).
The identifier Device_ID of the user device (that hosts the Authentication Token) in the device database.
A set of CipherSuiteClient proposals with the identifiers of the encryption algorithms it supports (to be synchronized with the Token Credentials possibilities—note that the matching algorithms may be pre-established since the two parties know each other in the system).
A random number R_C as part of the client challenge towards the server.

Step 1604—After receiving the Authentication Request, the Token Credentials server performs the following operations:
It uses User_ID to check on the user's enrollment in the system and to retrieve his/her cryptographic parameters from the user database:
{TIdN, Token_Attributes, H_2U=H2(WSP_AU_PIN, SALT_U)}
It uses Device_ID to check on the enrollment of the user device, based on which the Token Credentials server retrieves and stores the cryptographic parameters of the device from the device database, namely:
{H_2D=H2(MD_Fingerprint, SALT_D)}.
It retrieves its own set of CipherSuiteServer and matches it against the encryption algorithms supported by the Authentication Token as described in CipherSuite-Server—which, for example, may be RSA, although other algorithms may alternatively be supported.
It generates a random number R_S as part of the server challenge towards the client.
It retrieves its public encryption key certificate Cert_Server=Cert_MCW (KE).
It forms and sends to the client the following load:
Server Response {R_S, Cert_Server, CipherSuiteServer}

Step 1606—After receiving the Server Response from the Token Credentials server, the Authentication Token performs the following operations:

It retrieves the CipherSuiteServer of the Token Credentials and identifies RSA as commonly supported encryption algorithm with its own CipherSuiteClient.

It verifies that the pinning of the received $Cert_{13}$ Server corresponds to the witness pinning trace corresponding to the public encryption key certificate of the Token Credentials server stored in the Authentication Token since its initialization.

It uses the MCW public verification key KV_MCW to verify Cert_Server and obtain an authentic copy of the public encryption key KE of the Token Credentials server.

It generates at random a pre-master secret (pms).

It computes the Digital Envelope (DE) on pms using KE, i.e., DE=RSA(KE)[pms] and sends it to the server.

Step 1608—After receiving the Digital Envelope from the Authentication Token the server performs the following operations:

Use KD to open DE for retrieving pms, i.e., pms=RSA (KD)[DE].

Compute secure channel key K to be used by the record protocol of TLS from the pms value proposed by the Authentication Token together with the random values exchanged during the session (R_C, R_S):

K=SHA(pms, R_C, R_S)

Compute key confirmation value V=SHA(K,R_C,R_S) and sends it to the Authentication Token.

(Continuing with step 1608)—After receiving the key confirmation value V from the Token Credentials, the Authentication Token produces its own copy of the secure channel key K using the same formula as the server K=SHA(pms, R_C, R_S), and verifies it against its own computations, namely:

Verify V ?=SHA(K,R_C,R_S)

If verification is passed successfully, the Token Credentials server is considered authentic and the secure channel key K is passed to the record protocol for the encryption of all subsequent data exchanges till the end of the session with the Token Credentials server.

Figure 17:
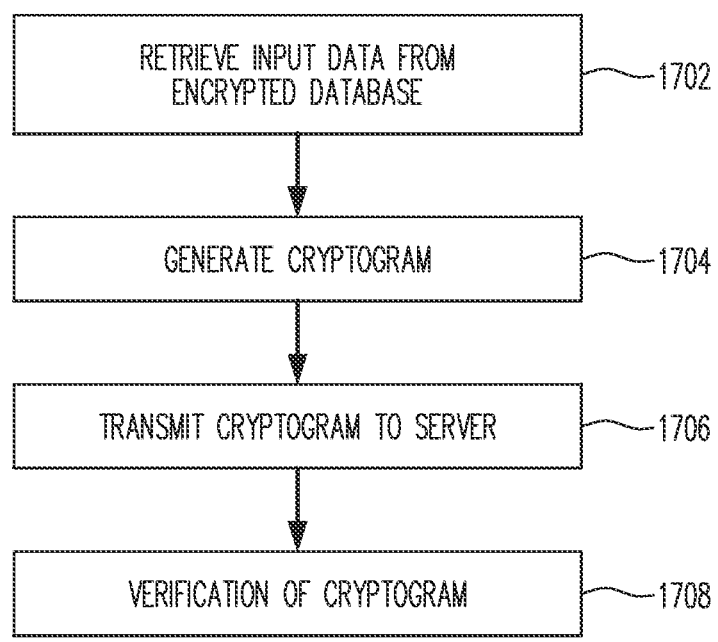
FIG. 17 is a flow chart that illustrates process stages related to a device authentication process stage of the process of FIG. 15.

FIG. 17 is a flow chart that illustrates details of step 1508 (device authentication) in FIG. 15. For the following discussion, "ATC" indicates the current value of the authenticator transaction counter, and "ATC-1" indicates the value of that counter from the previous (immediately preceding) execution/session of the user authentication protocol.

Step 1702, FIG. 17—The Authentication Token reads the Database Encrypted (DBE) to retrieve:

The common values used for all the executions of the protocol, namely:

H_2D=H2(MD_Fingerprint, SALT_D)

SALT_U

Note:

The SALT used for containing password dictionary attacks has different values for device authentication—as kept in the device fingerprint table of the device database, namely:

H_2D=H2(MD_Fingerprint, SALT_D)

and for user authentication as kept in the user database, namely

H_2U=H2(WSP_AU_PIN, SALT_U)

The values stored from the previous session of key production and distribution at a memory index in DBE corresponding to "ATC-1", i.e.:

ESUK*_MD=AES256-E[$K_{TR}$](SUK*_MD)

RAND*—the random (challenge value) used in the previous user authentication session Note: The algorithm below works for ATC >0. When ATC=0, the device authentication relies on an Authentication Code distributed by the WSP during the initialization phase, which is used as described below Step 1704, FIG. 17—The Authentication Token uses the DWB construct to compute:

DA_Cryptogram=MAC[SK*_MD](R_S, ATC)

Where:

R_S is the challenge value sent to the Authentication Token by the Token Credentials server in the handshake stage (step 1604, FIG. 16).

ATC—The current value (ATC_crt) of the Authenticator Transaction Counter

SK*_MD=SUK*_MD FnH H1(RAND*, H_2D), wherein the RAND* and H_2D are the values retrieved from the DBE.

SUK*_MD=AES256-I[ESUK*_MD], wherein the ESUK*_MD is the value retrieved from the DBE.

Step 1706, FIG. 17—The Authentication Token transmits the DA_Cryptogram to the Token Credentials server for verifying the device's authenticity proof.

Step 1708, FIG. 17—The Token Credentials server asks the Token Management Vault to compute the Token Master Key for device authentication TMK_MD as:

TMK_MD=3DES[WSP_MK_MD](Device_ID, MD_Fingerprint),

Where:

WSP_MK_MD is the system key of the WSP for the device authentication service.

Device_ID is the device's identifier as recorded in the device database

MD_Fingerprint is the unique trace computed by the mobile OS or Browser Extension on the Authentication Token software configuration.

The Token Credentials server uses TMK_MD for computing the session key for device authentication used in the previous execution as:

SK*_MD=3DES[TMK_MD](ATC-1)

The Token Credentials server can now compute the witness value of the device authenticator and compare it with the received value DA_Cryptogram, i.e., MAC[SK*_MD](R_S, ATC)?=DA_Cryptogram If the equality holds true, the device is considered authentic and the following phases of the user authentication protocol may be executed.

The Token Credentials server uses the user and device parameters retrieved from the databases at Step 1504 (FIG. 15), and requires the Token Transaction Processing to generate a fresh RAND (challenge value) for the following challenge/response execution, i.e., step 1510 of FIG. 15. Thus the following values are available for the next stage of the protocol:

{TIdN, Token_Attributes, H_2U=H2(WSP_AU_PIN, SALT_U)}

{H_2D=H2(MD_Fingerprint, SALT_D)}

RAND

The consumer authentication system described in this portion of the disclosure relies on a special key production and distribution schema, which may mitigate potential vulnerability of a software only security model with respect to storage of cryptographic keys for security services realization.

The key production as described below, for some embodiments, does not rely on the use of one long term service key per device stored in some encrypted database (as a counterpart to a Secure Element), which is diversified by the authentication token with the ATC for the realization of a session key for the running of the respective service.

Instead, in the mechanism for these embodiments, two "one-time" session keys are proposed to be used, as schematically illustrated in FIG. 11, and as summarized below:

(1) For the Device Authentication security service, the parties use the session key for Device Authentication denoted SK_MD, which is produced by the Token Credentials server in the current user authentication transaction for being used by the Authentication Token for the realization of the Device Authentication service in the next user authentication session. This key SK_MD is set in the Authentication Token at the value Authentication Code, during the initialization of the Authentication Token when ATC=0.

(2) For the user authentication service, the parties use the session key for user authentication, denoted SK_AU, which is produced by the Token Credentials server in the current user authentication transaction for being used by the Authentication Token for the realization of the user authentication service in the same user authentication session. This key SK_AU is never stored in the Authentication Token.

Figure 18:
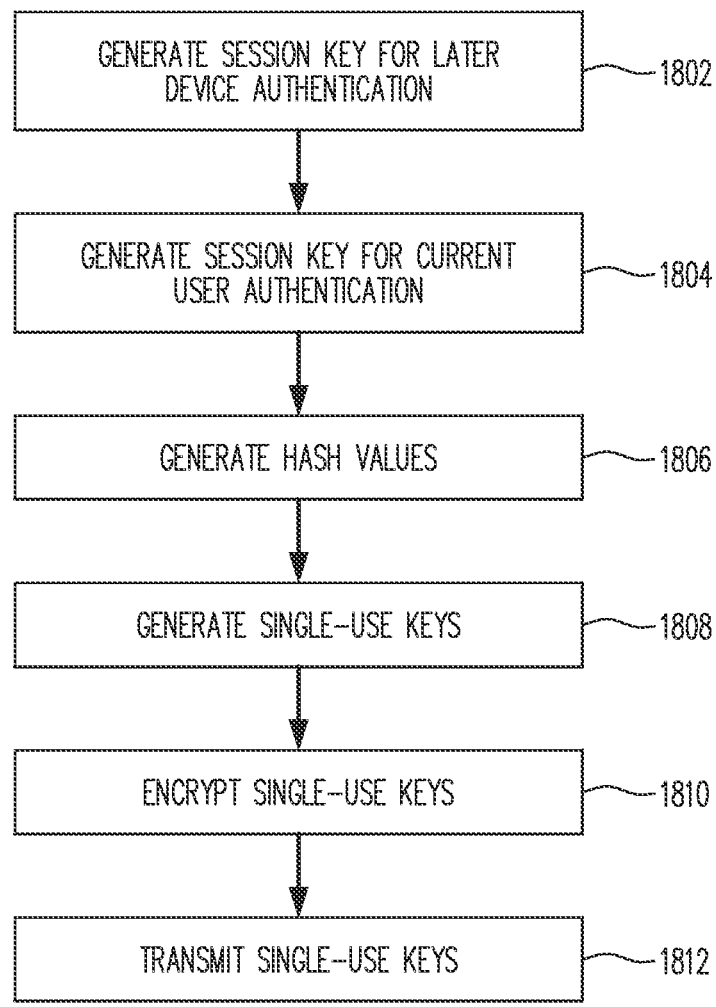
FIG. 18 is a flow chart that illustrates process stages performed in a central server in connection with session key production and distribution as part of the process of FIG. 15.

FIG. 18 is a flow chart that illustrates details of step 1510 of FIG. 15, which relates to production of the two keys just described.

Referring, then, to FIG. 18:

Step 1802, FIG. 18—The Token Credentials server reuses the key TMK_MD it has obtained at step 1708 (FIG. 17) for computing the session key for device authentication to be used in the next execution session of the user authentication as:

SK*_MD=3DES[TMK_MD](ATC)

Step 1804, FIG. 18—The Token Credentials server asks the Token Management Vault to compute the Token Master Key for Consumer authentication TMK_AU as:

TMK_AU=3DES[WSP_MK_AU](TIdN,TokenAttributes),

Where:

WSP_MK_AU is the system key of the WSP for the user authentication service.

TIdN is the Authentication Token identifier as recorded in the user database.

Token_Attributes is the set of attributes describing that the token may be used only for the user authentication protocol and not for payment transactions themselves.

The Token Credentials server uses TMK_AU for computing the session key for user authentication to be used in the current execution of the user authentication protocol as:

SK_AU=3DES[TMK_AU](ATC)

Step 1806, FIG. 18—The Token Credentials server computes the "hiding" parameters (e.g., hash values) for the "over" secure transporting (there is already TLS tunneling with encryption) and the secure dispatching of the session keys only towards the intended recipients, i.e., the user and his/her user device (initialized with a DWB construct relying on a unique transport key $K_{TR}$):

HASH_U=H1[RAND, H2(WSP_AU_PIN, SALT_U)]—hiding parameter for user authentication session key SK_AU.

HASH_D=H1[RAND, H2(MD_Fingerprint, SALT_D)]—hiding parameter for device authentication session key SK*_MD Step 1808, FIG. 18—The Token Credentials server computes the session keys to be securely distributed to the Authentication Token as Single-Use Keys (SUK) transformed through the "hiding" parameters:

SUK_AU=SK_AU FnH HASH_U. The SK_AU will be used by the Authentication Token to accomplish the current user authentication session.

SUK*_MD=SK*_MD FnH HASH_D. The SK*_MD will be firstly stored in the DBE of the Authentication Token and used by the Authentication Token to accomplish the Device Authentication phase in the next user authentication session.

Step 1810, FIG. 18—To perform the third level of encryption allowed by the DWB construct of the Authentication Token, the Token Credentials server may encrypt a last time the Single Use Keys (SUK_AU, SUK*_MD). The encryption is performed with the device's specific transportation key $K_{TR}$. Thus, the single use keys (SUK_AU) may be securely dispatched only by the user's Authentication Token whose DWB construct has generated randomly $K_{TR}$ at initialization:

ESUK=AES256-E[$K_{TR}$](SUK_AU)

ESUK*_MD=AES256-E[$K_{TR}$](SUK*_MD)

Step 1812, FIG. 18—The Token Credentials server transmits ESUK, ESUK*_MD, and RAND to the Authentication Token.

The following portion of this disclosure relates to the user authentication stage of the device/user authentication session.

Figure 19:
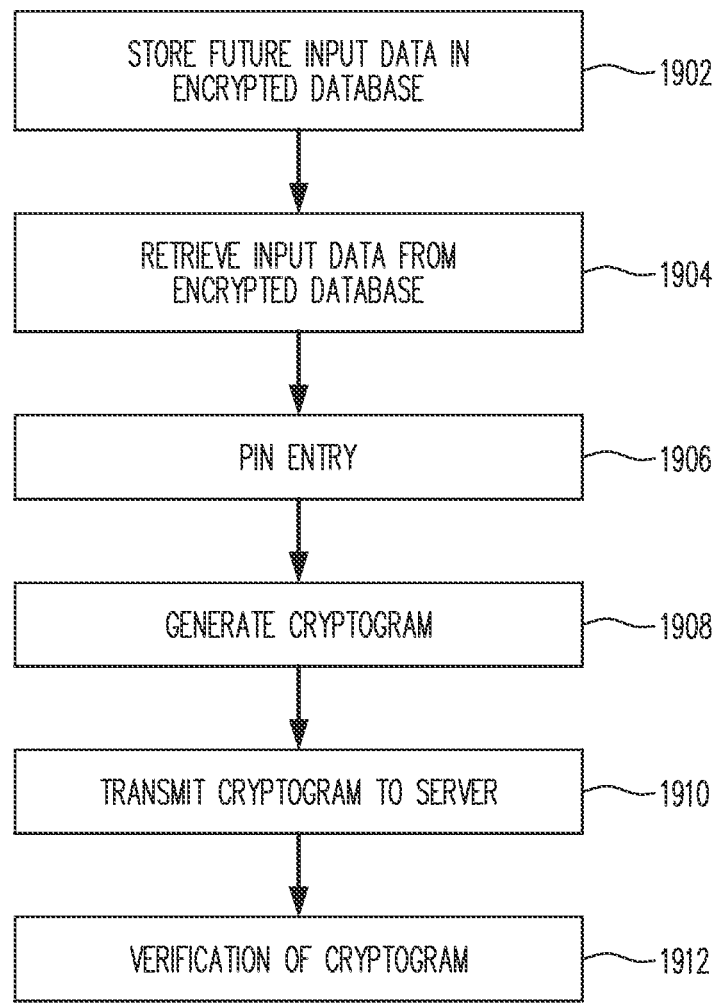
FIG. 19 is a flow chart that illustrates process stages related to a user authentication process stage of the process of FIG. 15.

FIG. 19 is a flow chart that illustrates details of step 1512 of FIG. 15.

Step 1902, FIG. 19—The Authentication Token stores in DBE the ESUK*_MD and RAND for the accomplishment of the Device Authentication phase during the next execution of the user authentication protocol.

Step 1904, FIG. 19—The Authentication Token retrieves the SALT_U from the DBE (SALT_U will serve as input data for an encryption computation/calculation as indicated below).

Step 1906, FIG. 19—The Authentication Token pops up the virtual PINPad to require the Consumer's PIN for the wallet authentication, namely WSP_AU_PIN. The user types in the required secret (i.e., user input of the PIN is prompted for and received).

Step 1908, FIG. 19—The Authentication Token computes:

AU_Cr=MAC(SK_AU)[Auth_Data], with Auth_Data as described above in the section of this disclosure following discussion of FIG. 12.

The session key for authentication SK_AU is retrieved by the Authentication Token with the DWB construct as follows:

SK_AU=SUK_AU FnH HASH_U,

With:

HASH_U=H1 [RAND, H2(WSP_AU_PIN, SALT_U)], with WSP_AU_PIN as provided by the user as authentication proof.

SUK_AU=AES256-I[$K_{TR}$](ESUK), as decrypted by the DWB construct of the user device from the envelope ESUK received from the Token Credentials server.

Step 1910, FIG. 19—The Authentication Token sends the cryptogram AU_Cr to the Token Transaction Processing within the wallet server configuration.

Step 1912, FIG. 19—The Token Transaction Processing performs the following processing:

It retrieves the initial RAND (challenge value) it has produced following completion of step 1708 (FIG. 17) for the Token Credentials server.

It receives from the Token Credentials server the SK_AU computed at step 1804 (FIG. 18).

It recompiles the Auth_Data in the same manner as the Authentication Token (as per the section of this disclosure following the discussion of FIG. 12) did starting from the RAND and ATC.

It compares the received AU_Cr?=MAC(SK_AU)[Auth_Data]. If the two values are equal the Token Transaction Processing server accepts the authenticity of the user.

Upon successful completion of both device and user authentication, the wallet server may allow the user to access his/her digital wallet via the user device. For example, the user may be permitted to select one payment account for use in a current purchase transaction, where the payment account is among a number of "cards on file" in the user's digital wallet. The purchase transaction may then go forward with a charge for the transaction to be made against the selected payment account.

For at least some purposes, all portions of the process of FIG. 15 that occur after completion of the device authentication phase or stage may be considered to be a user authentication phase or stage of the process.

Following sections of this disclosure provide an overview of setup operations for various entities that may be needed for a software-only authentication system, including for example the MPA/BE (mobile payment application/browser extension) and databases of the token credentials server.

One section below is concerned with the mechanism used for the DBE—database encrypted—in the user device. With use of static white-box techniques, relatively simple and effective protection may be provided for potentially vulnerable parameters in the user device.

Another section below provides further details concerning initialization of the DWB construct in the user device with a device-specific/unique transport key, so that the user device may serve as the "something you have" authentication factor in some embodiments. This technique may allow use of a single sequence of code to be included, e.g., in a standard downloadable wallet/payment app/MPA/BE in all user devices, where the app will be initialized differently for each user on each user device during an initialization phase of operation of the device.

Still another section below provides an overview of a user registration phase in the system 200, and additional sections relate to installation and initialization of the MPA/BE on the user device. To simplify ensuing discussion, reference will only be made to the MPA, but the discussion relative to the MPA should also be taken as applicable to the BE.

Figure 20:
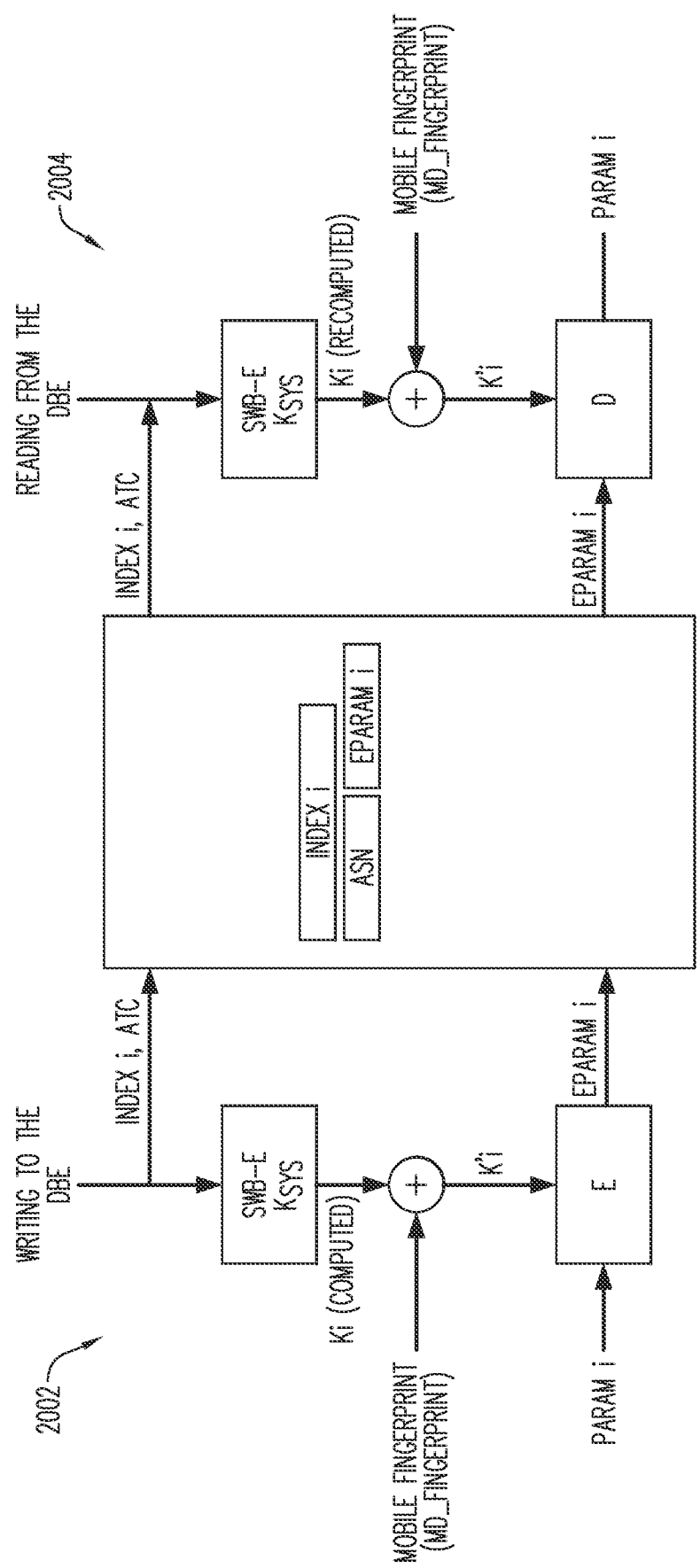
FIG. 20 is a diagram that illustrates operations involving an encrypted database provided in a user device in the system of FIG. 2.

The following section of the discussion includes a description of the above-mentioned DBE. FIG. 20 schematically illustrates details of a static white-box (SWB) cryptographic construct (as per part 602 of FIG. 6), which may be used to provide a transformation needed in the DBE.

A write operation is shown on the left-hand side (reference numeral 2002) of the FIG. 20—an Index i and an ATC value are inputs to the static white-box algorithm which uses an embedded $K_{SYS}$ to create a key Ki for that index value, which is then personalized to the mobile device by combination with the mobile fingerprint (MD_Fingerprint) to form K'i. K'i is then used to encrypt a parameter PARAMi to form the encrypted parameter EPARAMi, which is then stored under that Index i.

The read operation is the inverse of the write procedure, and is shown on the right-hand side (reference numeral 2004) of FIG. 20. K'i is recomputed using the same procedure as originally used to create it. K'i is then used to decrypt EPARAMi to recreate PARAMi.

All the procedures of FIG. 20 may be further protected by software obfuscation—that is, this whole process may take place in a "grey box".

The approach of FIG. 20 assumes that there is no user customization of the MPA—the mobile fingerprint is provided as the MPA—which is entirely generic—runs.

For purposes of the user authentication protocol, the DBE stores a reduced number of parameters as follows (illustrated in FIG. 21):

At Index=1, for ATC=0—both for the writing and the reading operations—there is stored the encrypted value with the appropriate K'i key of PARAM11=SALT_U (reference numeral 2102) and of PARAM12=H2_D (reference numeral 2104).

At Index=2, with ATC=ATC_crt for writing and with ATC=ATC_crt-1 for reading, there is stored PARAM21=ESUK*_MD (reference numeral 2106) and PARAM22=RAND* (reference numeral 2108). The initial parameter PARAM21 to be stored in the DBE is already a cryptogram produced by the Token Credentials server with the device specific transportation key $K_{TR}$, as explained above in connection with FIG. 18. When stored as EPARAM21 in the DBE, it is double encrypted under the key K'i determined by the current value of the ATC.

The following section of the disclosure is concerned with initialization of the DWB construct in the user device.

This discussion of the functionality of the Dynamic White Box (DWB) construct is pertinent to FIG. 14. The following also represents an implementation of the approach shown in the lower portion 604 of FIG. 6. In an implementation as described below, the transformation shown in lower portion 604 of FIG. 6 may be decryption with a key denoted $K_{TR}$ (denoting a "transport key").

Figure 21:
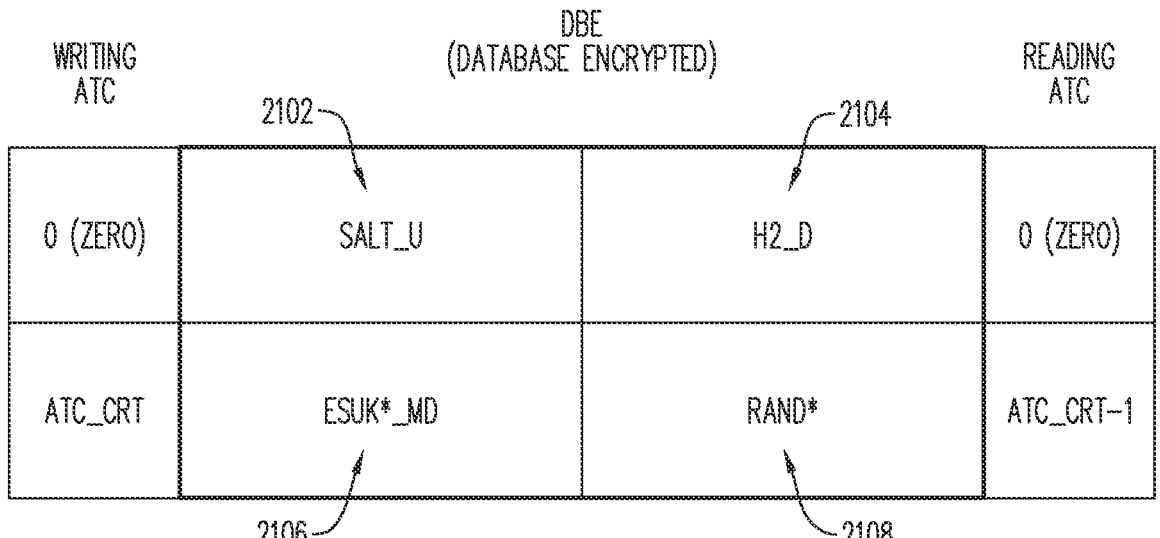
FIG. 21 is a diagram that illustrates example contents of the encrypted database of FIG. 20 in accordance with some embodiments.

As for the SWB construct discussed in connection with FIGS. 20 and 21, it may be desirable that this whole process takes place in a grey-box environment, wherein the entire computation of the HASH=H1[RAND, H2(WSP_AU_PIN, SALT)] is protected through software obfuscation techniques. The decryption algorithm implemented in the DWB construct may be a parameterized AES256-I algorithm with the key $K_{TR}$ set as a parameter in the white box protected environment of the DWB construct.

During an initialization stage performed by the user, a generic MPA downloaded from an application store may have a system key $K_{SYS}$ for the SWB AES256-I before initialization replaced with a device key $K_{TR}$, for the device specific block AES256-I after initialization.

In various embodiments, the same generic MPA may be used to achieve an SWB or DWB security level, dependent on whether the MPA initialization takes place, or whether it is supported by the mobile computing device.

After the change of key from $K_{SYS}$ to $K_{TR}$, an attacker will no longer be able to make an effective code or data lifting attack even if the grey box protection of MPA is circumvented, as the attacker will not be able to replicate the relevant processes on his or her own hardware because key $K_{TR}$ will not be available.

The decryption block SWB AES256-I is in effect now device specific and is generated as a dynamic white box implementation AES256-I with the random key $K_{TR}$. The Token Credentials server protects the SUK_AU from the moment it is generated until the moment it is encrypted with the transport key $K_{TR}$.

The basic principle of operation, in some embodiments, is that the MPA is instantiated with a random key $K_{TR}$ only at the time the initialization procedure is called (see also the discussion below in connection with FIGS. 25-27). This key will be used as a transport key in the hostile environment to carry over the operational key SUK_AU in an encrypted form from its generation in the Token Credentials server until it is used by the MPA for the computation of the SK_AU. The dynamic white-box implementation of the MPA then performs a decryption operation by using the transport key $K_{TR}$ to obtain the key SUK_AU in such a way that no information on this key is exposed outside the white-box strengthened sandbox.

Figure 22:
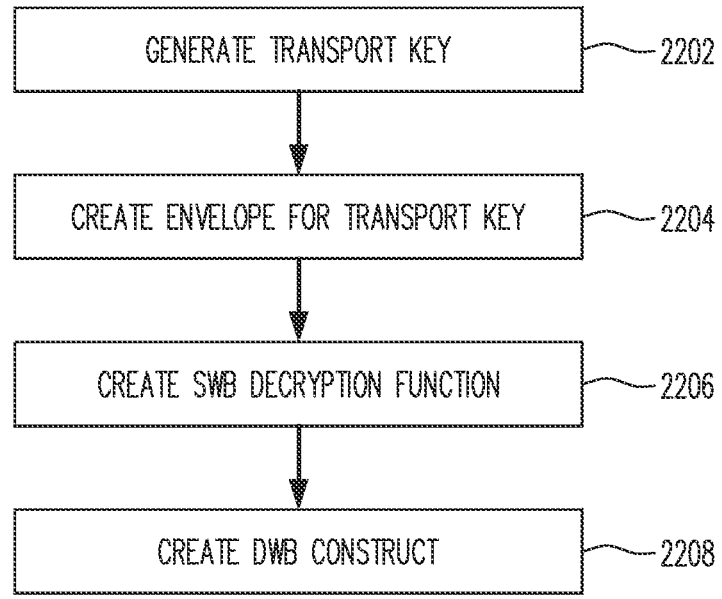
FIG. 22 is a flow chart that illustrates a process for initializing white box cryptography functions in a user device in the system of FIG. 2.

The DWB initialization sequence consists of the following example calls of a crypto API for decryption:

FIG. 22 is a flow chart that illustrates the DWB initialization sequence.

(Step 2202, FIG. 22) Generate at random the transportation key ktr on 16 bytes, i.e., ktr=RANDOM (16).

(Step 2204, FIG. 22) Use the native SWB-E $K_{SYS}$ construct of the MPA (as discussed above in connection with FIGS. 20 and 21) to create an envelope containing ktr for the Token Credentials server, i.e., EKTR=SWB-E[$K_{SYS}$](ktr). This may result in a coding as for example:

EKTR=NativeS_Encrypt_WBC(ktr,16).

This envelope will be sent in the initialization phase to the Token Credentials server.

(Step 2206, FIG. 22) Create the SWB decryption function S_Decrypt_WBC with key ktr, for being used in the DWB construct:

S_Decrypt_WBC (input, size),

Where:

input is the encrypted envelope ESUK with ktr, which is transporting a single use key SUK_AU.

size is its byte length (e.g., 16 bytes)

This function is created only once during the initialization phase by an API call like (for example):

Create Static WBC (decrypt, ktr, S_decrypt_WBC( ), AES256)

The function S_Decrypt_WBC uses the device specific transport key ktr as a static key embedded in a white box cryptographic mode in the AES256-I.

(Step 2208, FIG. 22) Create the DWB construct as a MAC (for example), which may be done in accordance with aspects of the EMV payment protocol and/or in accordance with the well-known standard ISO 9797-1:

D_MAC_WBC (key, vector, combination, input, size),

Where key is the dynamic key SUK_AU which is the dispatching of the ESUK through S_Decrypt_WBC using the transport key ktr;

vector is the component that may be combined with the SUK_AU key to get the session key SK_AU, i.e., vector is HASH_U=H1[RAND, H2(WSP_AU_PIN, SALT_U)];

combination is the algorithm of getting the resulting MAC secret as:

combination[key, vector];

e.g., combination may be FnH(nKey,H1) as described in the above section in regard to security parameters input is the string of authentication data to be MAC-ed;

size is its byte length.

This function may be created by an API call like:

Create Dynamic WBC (ktr, S_Decrypt_WBC(ESUK), D_MAC_WBC( ) "ISO9797-1").

As can be seen, it may be required that the Token Credentials server be initialized with $K_{SYS}$, to be able to receive and record all envelopes with the cryptograms of the transportation keys ktr of each device, as per step 2204 set forth above.

Figure 23:
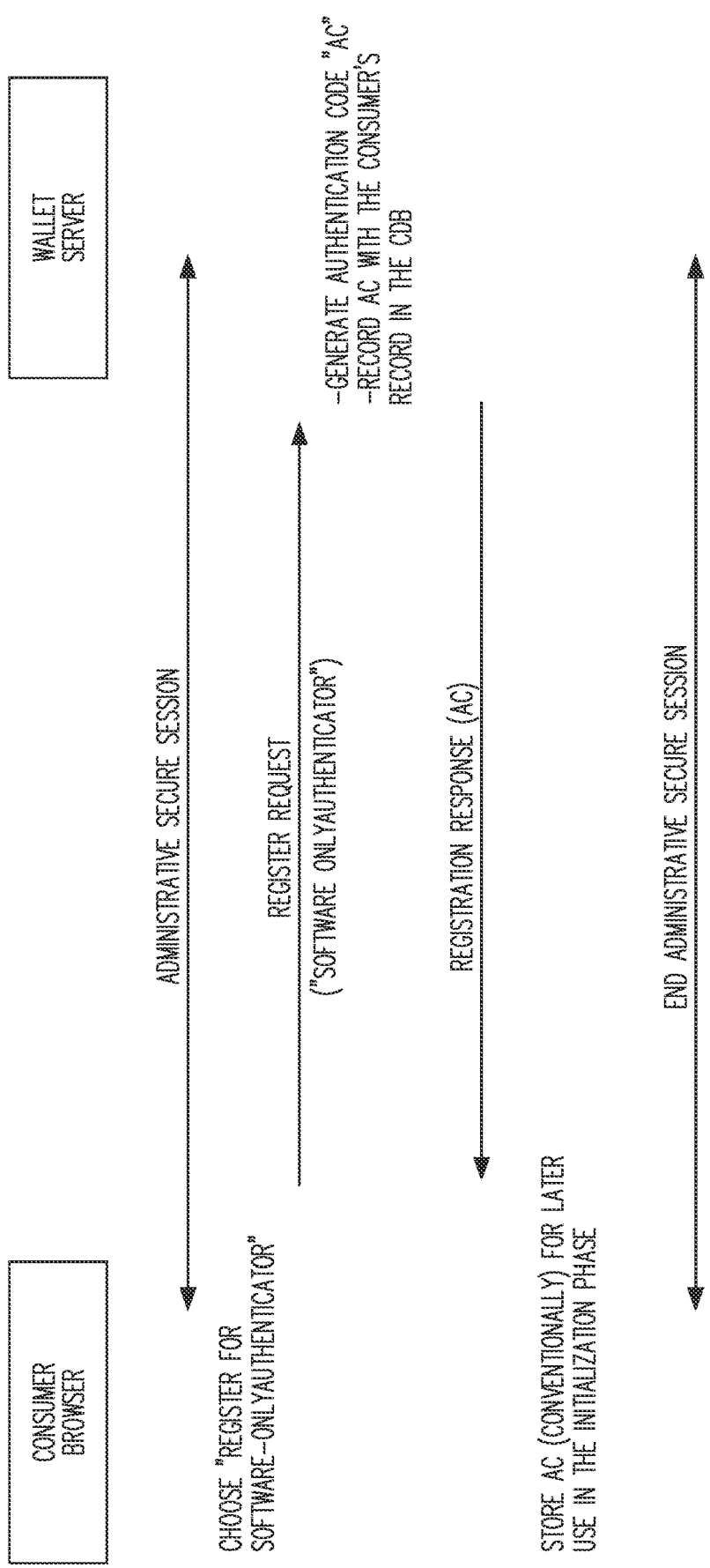
FIG. 23 is a diagram that illustrates a user registration process in the system of FIG. 2.

The following section of the disclosure is concerned with user registration with the wallet server. An overview of this phase is illustrated in FIG. 23.

In the user registration phase, the user connects to the wallet server within an administrative browsing session, using the static user authentication credentials, namely (User_ID, password).

The user chooses the function "Register for software-only authenticator" on the administration website.

This action sends a registration request to the server. The server in its turn generates a random Authentication Code (AC), which will be sent back to the user. The server updates the AC value in the user record in the user database (also referred to as the Consumers Database or "CDB").

After receiving the AC from the wallet server, the user will store it with any conventional secure method, for being provided later as initial user and device authentication for the initialization stage (as described below in connection with FIGS. 25-27).

This ends the user registration phase.

Figure 24:
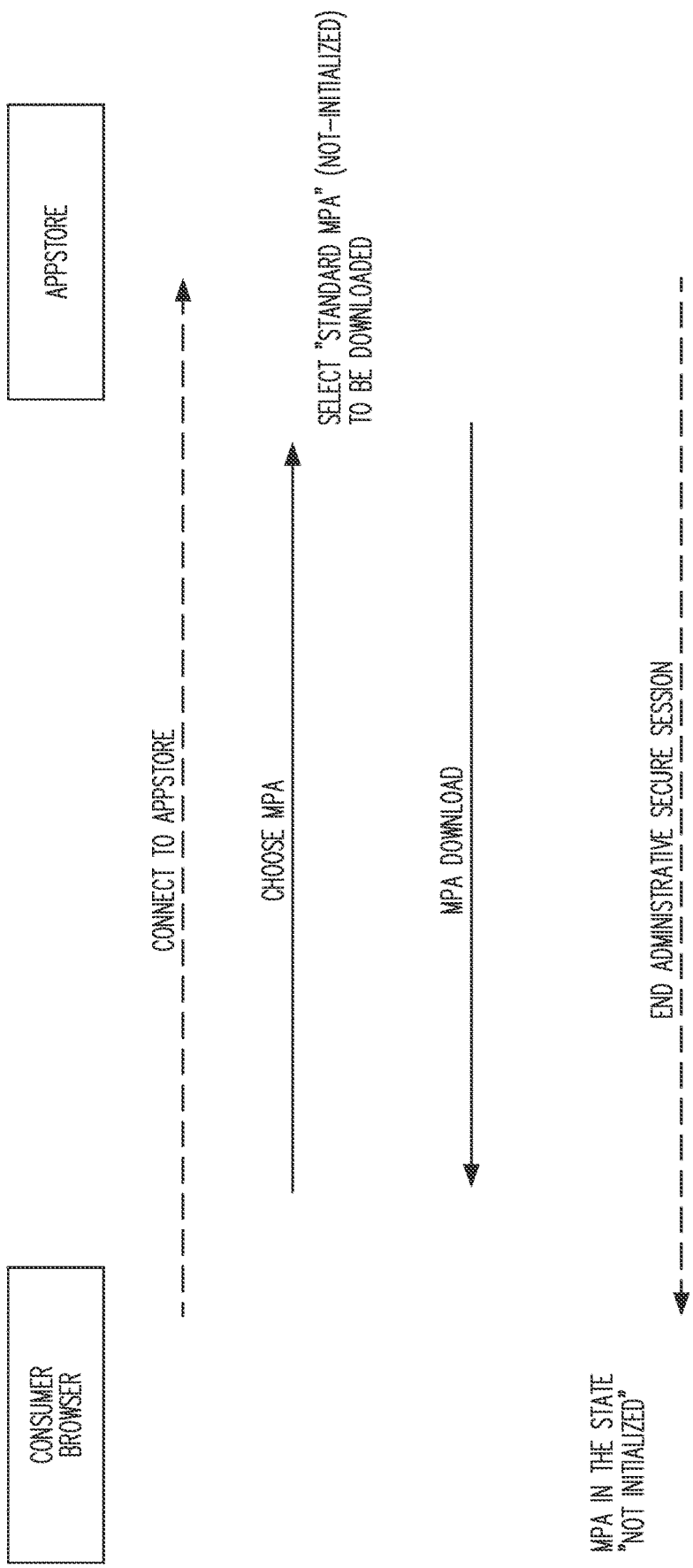
FIG. 24 is a diagram that illustrates a process for installing payment functionality in a user device in the system of FIG. 2.

The next section of this disclosure is concerned with installation of the MPA on the user device. FIG. 24 provides an overview of the MPA installation phase.

Independently from registering for the software-only authentication service, the user may proceed to the installation of the MPA (or BE) on his device.

To this end, the user may choose the MPA application from an App Store (or Web Store in the case of a BE), and proceed to its downloading in his/her user device. For purposes of this disclosure, the assumption is that the downloading is free and the user is not required to present the AC as proof of initial user (and device) authentication.

The downloaded MPA is in a "NOT INITIALIZED" state, with the following standard content:

Initialization URL to be used for the initialization phase of the MPA with the Token Credentials server.

Cert_Server=Cert_MCW(KE)—the public encryption key certificate issued by MCW for the Token Credentials server of the wallet server (as referred to in connection with FIG. 15).

Validation Pinning—the pinning value of the Cert_Server, initially known by the MPA, for weak server authentication.

The SWB-E $K_{SYS}$ construct for the initial secure handover of the transportation key $K_{TR}$ of the DWB construct to the Token Credentials server.

"Not initialized" DWB construct with system key $K_{SYS}$.

The next section of this disclosure is concerned with initialization of an MPA (or, though not explicitly mentioned, a BE).

In the initialization phase, the MPA starts processing in state "NOT INITIALIZED", connects to the Initialization URL, and establishes a secure channel—for example—as described above in connection with FIGS. 15 and 16, wherein the user authenticates to the Token Credentials server using the conventional (User_ID, password). The server retrieves the corresponding record of the user in the user database/Consumers Database (CDB).

After successful user authentication the server requires the MPA/user to present the initial Authentication Code (AC) in connection with a device identifier (Device_ID) and a Device Fingerprint, say, for simplicity, Mobile Device Fingerprint (MD_Fingerprint) (but in other embodiments, it may be advisable that this also be possible for a Browser Extension (BE) too). To this end, the MPA calls the mobile OS for generating appropriate Device_ID and MD_Fingerprint values, packages them together with AC, and sends them to the server.

Figure 25:
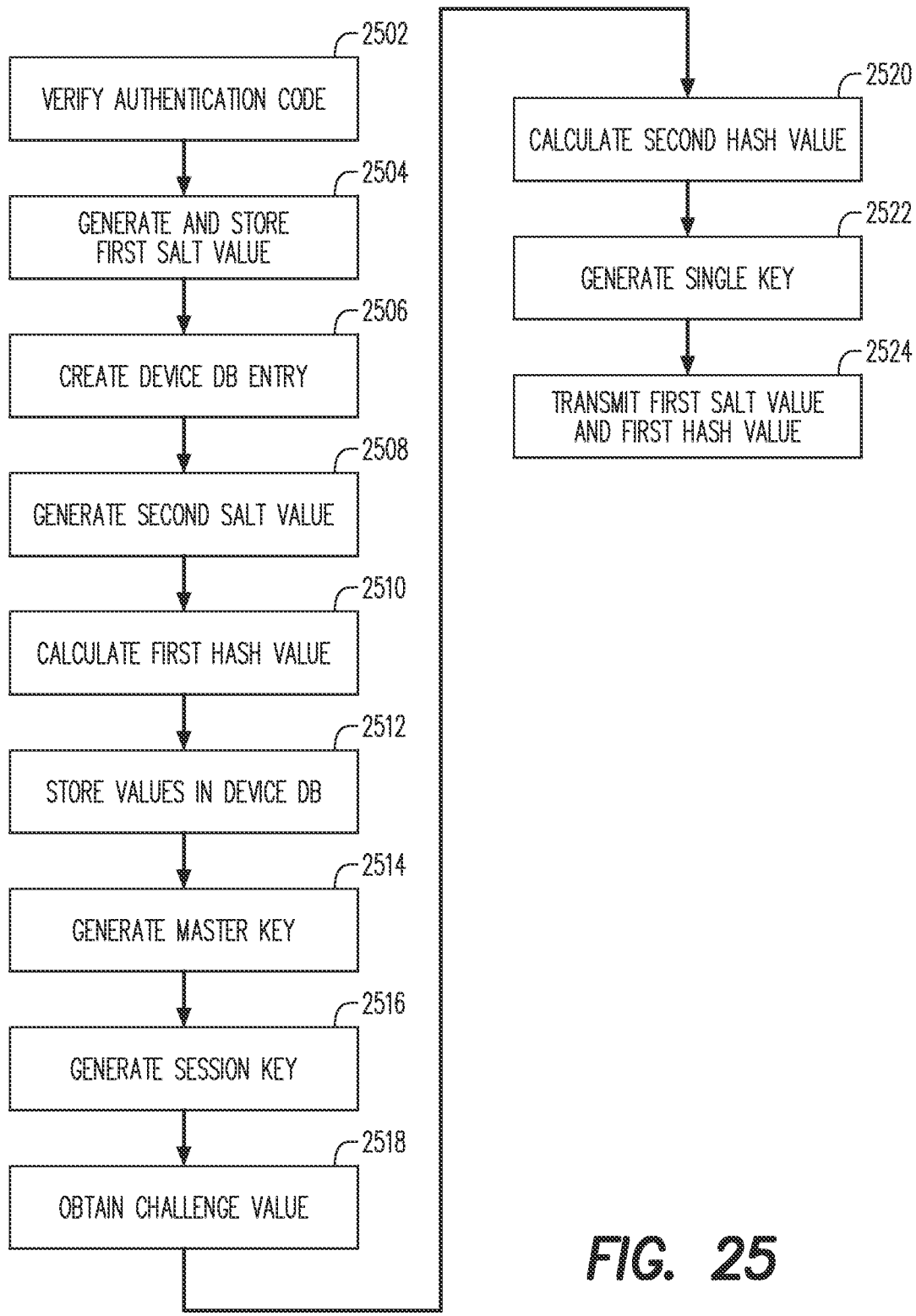
FIG. 25 is a flow chart that illustrates process stages performed in a wallet server in connection with initialization of a payment application in a user device in the system of FIG. 2.

FIG. 25 is a flow chart that illustrates a process that may then be performed by the wallet server.

The wallet server may perform the following processing:

(Step 2502, FIG. 25) From CDB retrieve the witness AC from the user's record (as stored during the user registration phase—see discussion related to FIG. 23) and compares it with the received AC, as provided in the MPA by the user. It continues processing if the two values are identical.

(Step 2504) Generate SALT_U and store it in the user's record next to the User_ID in CDB.

(Step 2506) Create an entry for the user device in the Devices Database (DDB) for the given Device_ID and MD_Fingerprint.

(Steps 2508 and 2510) Generate SALT_D and compute H_2D=H2(MD_Fingerprint, SALT_D) (reference is also made to the above discussion of Step 1702, FIG. 17).

(Step 2512) Record (H2_D, SALT_D) in DDB with the record corresponding to the Device_ID.

(Step 2514) Compute TMK_MD as per the above discussion of step 1708, FIG. 17.

(Step 2516) Use TMK_MD for computing SK*_MD at ATC=0, which in some embodiments may be done as described in the above discussion of step 1802, FIG. 18.

(Step 2518) Ask the Token Transaction Processing of the wallet server for the generation of a fresh challenge value RAND.

(Step 2520) Compute HASH_D=H1(RAND, H2_D), which may be done in accordance with the above discussion of step 1806, FIG. 18.

(Step 2522) Compute SUK*_MD=SK*_MD FnH HASH_D, which may be done in accordance with the above discussion of step 1808, FIG. 18.

(Step 2524) Transmit SALT_U and H2_D to MPA/user device.

Figure 26:
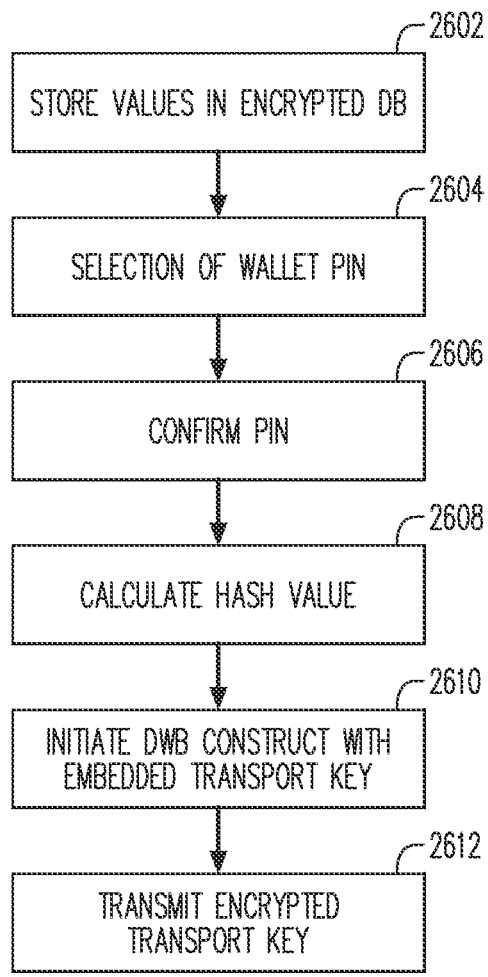
FIG. 26 is a flow chart that illustrates process stages performed in a user device in connection with initialization of the payment application referred to in connection with FIG. 25.

FIG. 26 is a flow chart that illustrates a process that may then be performed by the MPA/user device.

After receiving the {SALT_U, H2_D)} from the server, the MPA/user device may perform the following processing:

Starts processing in state "NOT INITIALIZED".

(Step 2602, FIG. 26) Perform write operation in DBE at Index=1, for ATC=0 to store {SALT_U, H2_D}.

(Step 2604) Pop up secure emulated PINPad, require user to choose the wallet PIN for authentication, and capture it as the first value of the WSP_AU_PIN.

(Step 2606) Require user to confirm the PIN selection, and capture a second value of WSP_AU_PIN.

(Step 2606, continued; step 2608) Compare the two values captured for the WSP_AU_PIN and if they match compute:

H2_U=H2(WSP_AU_PIN, SALT_U)

(Step 2610) Run the initialization of the DWB construct, which may be done in accordance with techniques referred to in the above discussion of FIG. 22 and in a section of this disclosure that precedes the discussion of FIG. 22; it may be noted that, in some embodiments, EKTR=SWB-E[$K_{SYS}$] ($K_{TR}$) can be written more precisely as:

EKTR=AES256-E[$K_{SYS}$]($K_{TR}$, SALT_U, H2_D, H2_U)

(Step 2612) Transmit EKTR to the server.

Figure 27:
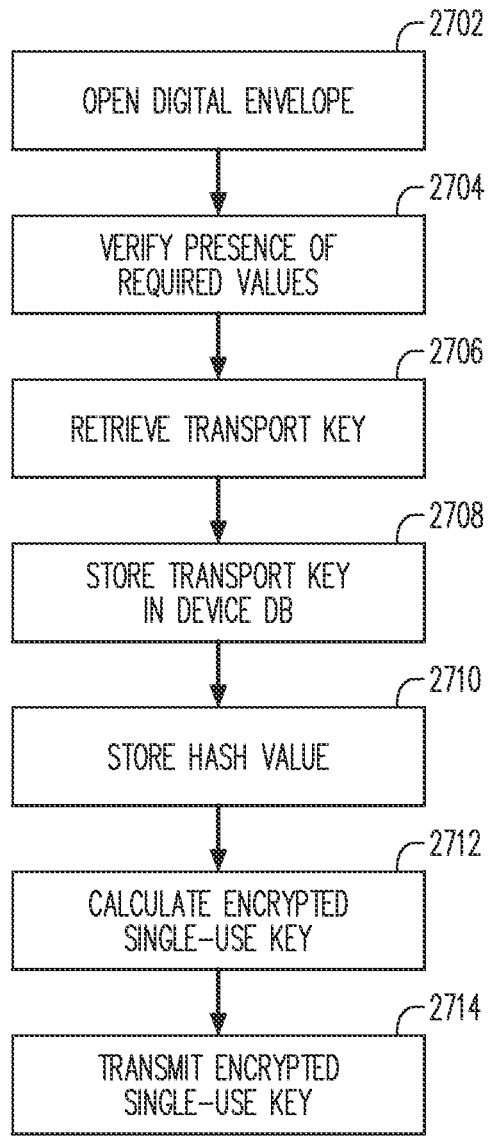
FIG. 27 is a flow chart that illustrates further process stages performed in a wallet server in connection with initialization of the payment application referred to in connection with FIG. 25.

FIG. 27 is a flow chart that illustrates a process that may then be performed by the wallet server.

When receiving the EKTR the wallet server may perform the following steps:

(Step 2702, FIG. 27) Open the digital envelope EKTR with the previously initialized system key KSYS and get the string S:

S=AES256-I[$K_{SYS}$](EKTR)

(Step 2704) Identify in the string S the known patterns, represented by SALT_U and H2_D. Proceed only if these two retrieved values equal the previously sent ones.

(Step 2706) Retrieve the transport key $K_{TR}$ corresponding to the Consumer device as well as the H2_U.

(Step 2708) Store securely $K_{TR}$ in connection with Device_ID record in DDB.

(Step 2710) Store H2_U next to SALT_U in CDB.

(Step 2712) Compute ESUK*_MD=AES256-E[$K_{TR}$] (SUK*_MD), which may occur in a manner as discussed above in connection with step 1810, FIG. 18.

(Step 2714) The server sends ESUK*_MD to the MPA/user device.

After receiving ESUK*_MD from the server, the MPA/user device will write it in the DBE at Index=2 and for ATC=ATC_crt (which now is zero). This cryptogram will serve in the first running of the user authentication protocol to provide the cryptographic key for performing the strong Device Authentication function. The MPA sends an "Initialization phase completed OK" message to the server and changes its internal state from "NOT INITIALIZED" to "INITIALIZED".

After receiving the confirmation of successful MPA initialization, the server will validate the record corresponding to the Device_ID in the DDB, and will validate the new items added to the user record with User_ID in the CDB. It will mark both records with a value "ACTIVE" in the status field. This completes the initialization of the user and his/her device in the wallet server.

User and device authentication processes as described in this disclosure may meet relevant regulatory requirements for online payment security in a convenient, cost-effective manner, while also providing a straightforward, uncomplicated user experience. In addition, at least some processes described herein may provide a very high degree of security and reliability, without the costs and burdens associated with hardware-based security features, such as embedded secure elements or implementation of payment security on SIM cards. Moreover, in many respects, the processes described herein may leverage existing payment infrastructure in a novel manner, which may add to the cost effectiveness of the user/device authentication solutions described herein.

While user and/or device authentication has been discussed above in the context of an online purchase transaction, in some embodiments the same or similar user and/or device authentication protocols may be applied to in-store purchase transactions, either "in-aisle" or with the participation of a POS terminal in a retail store location for a customer/user who is also present at the POS terminal In example embodiments described herein, the two-factor authentication approach has called for "what you have" (a computing device with device specific software-only authentication data stored therein) plus "what you know" (a PIN or other secret information/password). In other embodiments, however, in place of or in addition to the "what you know" authentication factor, a "what you are"/biometric authentication factor may be used. For example, the user device may include fingerprint scanning functionality, and the user-proof data element (denoted WSP_AU_PIN in the case of PIN-based user authentication) may include one or more data elements in a standard format derived from a result of scanning the user's fingerprint. Other types of biometric measures may also or alternatively be employed.

As used herein and in the appended claims, the term "secret code" refers to a PIN, password, or other sequence of characters and known to the device user (and generally kept secret by the device user), whether or not stored in the device employed to access the services provided in by the wallet server. It will be noted that in many embodiments described herein, the PIN is not stored in the user device except for the limited time during an authentication session after it is entered and until it is used as an input to a cryptographic process in the user device.

As used herein and in the appended claims, the terms "immediately preceding" or "immediately succeeding" refer to relative positions of events in a sequence of events, and does not necessarily imply nearness in time.

As used herein and in the appended claims, the term "payment application" include a mobile wallet application, a browser extension or a web page downloaded to a computing device.

The term "computing device" includes personal computers, tablet computers and smartphones.

The term "personal computer" or "PC" includes laptop and notebook computers.

It should be understood that in the processes described herein, a current transaction and a subsequent transaction may be next to each other in a sequence of transactions by a given user device, but may be separated in time by hours or days (e.g., may be more than 24 hours apart).

As used herein and in the appended claims, the term "e-commerce" refers to purchases via a merchant's online store, and/or "in-aisle" shopping/payment or any other transaction in which payment is made over the internet or via interaction by a mobile application with a remote server or other computer.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices which represent clients submitting service requests.

The flow charts and descriptions thereof herein should not be understood to prescribe a fixed order of performing the method steps described therein. Rather the method steps may be performed in any order that is practicable, including simultaneous performance of at least some steps.

As used herein and in the appended claims, the term "payment card system account" includes a credit card account, a deposit account that the account holder may access using a debit card, a prepaid card account, or any other type of account from which payment transactions may be consummated. The terms "payment card system account", "payment card account" and "payment account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method of performing a sequence of payment transactions using a computing device, the sequence of payment transactions including a first payment transaction and a second payment transaction, the second payment transaction immediately following the first payment transaction in the sequence of payment transactions, each of said payment transactions including a respective device authentication stage and a respective user authentication stage, the method comprising:
performing the device authentication stage of the first payment transaction;
performing the user authentication stage of the first payment transaction using a first session cryptographic key;
receiving a key input during the user authentication stage of the first payment transaction;
generating a second session cryptographic key, said generating based in part on the received key input, said second session cryptographic key different from said first session cryptographic key;
performing the device authentication stage of the second payment transaction, said performing the device authentication stage of the second payment transaction including using the generated second session cryptographic key as an input value; and
performing the user authentication stage of the second payment transaction using a third session cryptographic key; the third session cryptographic key different from the first and second session cryptographic keys.

2. The method of claim 1, further comprising:
storing the input to be used for generating the second session cryptographic key in the computing device for a period of time, said period of time after completion of the first payment transaction and before commencement of the second payment transaction.

3. The method of claim 2, further comprising:
receiving a challenge value in the computer device as part of the user authentication stage of the first payment transaction; the challenge value provided to the computing device by a remote server.

4. The method of claim 2, further comprising:
using the challenge value as an input value for a cryptographic operation performed as part of the device authentication stage of the second payment transaction.

5. The method of claim 4, further comprising:
storing the challenge value in the computing device during said period of time.

6. The method of claim 1, further comprising:
decrypting a first single-use key to obtain the first session cryptographic key, the first single-use key provided to the computing device from a remote server in connection with the first payment transaction;
decrypting a second single-use key to obtain the second session cryptographic key, the second single-use key provided to the computing device from the remote server as part of the first payment transaction.

7. The method of claim 1, wherein the computing device is selected from the group consisting of: a mobile telephone, a personal computer, and a tablet computer.

8. The method of claim 1, wherein a secret code is input into the computing device in connection with the respective user authentication stages of the first and second payment transactions, said secret code used by the computing device as an input value for respective cryptographic processes performed by the computing device in connection with the respective user authentication stages of the first and second payment transactions.

9. The method of claim 1, wherein a user of the computing device is permitted, during the first and second payment transactions, to access a digital wallet assigned to the user and hosted in a remote wallet server.

* * * * *